(12) United States Patent
Hatanaka et al.

(10) Patent No.: US 11,009,639 B2
(45) Date of Patent: May 18, 2021

(54) POLARIZING PLATE AND POLARIZING PLATE ASSEMBLY

(71) Applicant: Sumitomo Chemical Company, Limited, Tokyo (JP)

(72) Inventors: Nobuyuki Hatanaka, Osaka (JP); Yosuke Ota, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 100 days.

(21) Appl. No.: 16/189,231

(22) Filed: Nov. 13, 2018

(65) Prior Publication Data

US 2019/0094433 A1 Mar. 28, 2019

Related U.S. Application Data

(63) Continuation of application No. 15/337,465, filed on Oct. 28, 2016, now Pat. No. 10,145,997.

(30) Foreign Application Priority Data

Oct. 30, 2015 (JP) .............................. JP2015-214643

(51) Int. Cl.
*G02B 5/30* (2006.01)
*G02B 1/10* (2015.01)
(Continued)

(52) U.S. Cl.
CPC ............. *G02B 5/3016* (2013.01); *G02B 1/10* (2013.01); *G02B 5/305* (2013.01); *G02B 5/3083* (2013.01);
(Continued)

(58) Field of Classification Search
CPC .......... G02B 1/08; G02B 5/30; G02B 5/3016; G02B 5/3025; G02B 5/3033;
(Continued)

(56) References Cited

U.S. PATENT DOCUMENTS 6,798,487 B1 9/2004 Ohtani et al.
6,952,245 B2 10/2005 Sugino et al.
(Continued)

FOREIGN PATENT DOCUMENTS

CN 102879848 A 1/2013
CN 104345368 A 2/2015
(Continued)

OTHER PUBLICATIONS

Office Action dated Mar. 22, 2018 in U.S. Appl. No. 15/337,465 by Hatanaka.
(Continued)

*Primary Examiner* — Arnel C Lavarias
(74) *Attorney, Agent, or Firm* — Panitch Schwarze Belisario & Nadel LLP

(57) ABSTRACT

An object of the present invention is to solve the problems which can be peculiarly generated in a coating-type optical film, and provide an optical film which hardly causes deterioration in optical performance with time, a display device equipped with the optical film, and a process for producing the optical film, and there is provided a polarizing plate having a diffusion preventing layer A having the thickness of 0.05 μm to 3 μm, a polarizing film comprising a polymer of a polymerizable liquid crystal and a dichroic coloring matter, and a diffusion preventing layer B having the thickness of 0.05 μm to 3 μm, in this order.

23 Claims, 1 Drawing Sheet

(51) Int. Cl.
*G02F 1/1335* (2006.01)
*B32B 37/00* (2006.01)
*B32B 37/12* (2006.01)

(52) U.S. Cl.
CPC ...... *G02F 1/133528* (2013.01); *B32B 37/025* (2013.01); *B32B 37/12* (2013.01); *B32B 2255/00* (2013.01); *B32B 2305/72* (2013.01); *B32B 2307/42* (2013.01); *G02F 2201/501* (2013.01)

(58) Field of Classification Search
CPC .... G02B 5/3083; G02B 27/28; G02B 27/286; G02F 1/13; G02F 1/1313; G02F 1/133; G02F 1/1333; G02F 2001/133302; G02F 1/133308; G02F 2001/133331; G02F 1/1335; G02F 1/133502; G02F 1/133504; G02F 1/133528; G02F 1/133533; G02F 2001/133541; G02F 2001/133543; G02F 1/13363; G02F 1/133337
USPC ............ 359/483.01, 487.01, 487.02, 487.06, 359/489.01, 489.07, 489.2; 349/194, 1, 5, 349/11, 16, 56, 58, 84, 96, 98, 122, 162, 349/193, 117
See application file for complete search history.

(56) References Cited

U.S. PATENT DOCUMENTS

| | | | |
|---|---|---|---|
| 9,671,538 B2 * | 6/2017 | Pau | G02B 5/3016 |
| 10,145,997 B2 * | 12/2018 | Hatanaka | G02B 5/3016 |
| 2004/0218117 A1 | 11/2004 | Matsuoka et al. | |
| 2007/0159580 A1 | 7/2007 | Yoshioka et al. | |
| 2010/0257678 A1 * | 10/2010 | Sadamitsu | C09B 31/22 8/641 |
| 2010/0301271 A1 | 12/2010 | Adlem et al. | |
| 2015/0042942 A1 | 2/2015 | Hatanaka et al. | |
| 2016/0216424 A1 | 7/2016 | Seo et al. | |

FOREIGN PATENT DOCUMENTS

| | | |
|---|---|---|
| JP | S63061203 A | 3/1988 |
| JP | 2001091747 A | 4/2001 |
| JP | 2004245924 A | 9/2004 |
| JP | 2010537955 A | 12/2010 |
| JP | 2013037353 A | 2/2013 |
| JP | 2014213488 A | 11/2014 |
| JP | 2014238533 A | 12/2014 |
| JP | 2016139133 A | 8/2016 |
| TW | 201120150 A | 6/2011 |

OTHER PUBLICATIONS

English Translation of Office Action dated Jan. 15, 2020 in CN Application No. 201610959777.X.
English Translation of Office Action dated Jun. 28, 2020 in CN Application No. 201610959777.X.
English Translation of Office Action dated Aug. 3, 2020 in TW Application No. 105135100.
English Translation of Office Action dated Aug. 25, 2020 in JP Application No. 2016211289.

* cited by examiner

POLARIZING PLATE AND POLARIZING PLATE ASSEMBLY

CROSS-REFERENCE TO RELATED APPLICATION

This application is a Continuation of U.S. patent application Ser. No. 15/337,465, filed Oct. 28, 2016, which claims priority under 35 U.S.C. § 119(b) to Japanese Patent Application No. 2015-214643, filed Oct. 30, 2015, and the disclosures of which are incorporated herein by reference.

BACKGROUND OF THE INVENTION

Field of the Invention

The present invention relates to a polarizing plate. Also, the present invention relates to a polarizing plate with a front plate and an elliptic polarizing plate, as well as a display device equipped with the polarizing plate of the present invention and a process for producing the polarizing plate of the present invention.

Description of the Related Art

In a flat panel display device (FPD), a polarizing plate and an optical film such as a phase difference film are used. As such an optical film, in addition to a polarizing film in which a dichroic coloring matter such as iodine is oriented and adsorbed on a polyvinyl alcohol-based resin film, an optical film which is produced by coating a composition containing a polymerizable liquid crystal on a substrate is known. For example, Patent Document 1 describes the optical film exhibiting reverse wavelength dispersibility.

PRIOR ART DOCUMENTS

Patent Documents

Patent Document 1: JP-T-2010-537955

SUMMARY OF THE INVENTION

Problems to be Solved by the Invention

Reduction in the thickness of a flat panel display device is demanded by consumers, and since such a coating-type optical film is relatively easy in reduction in the thickness, it is the very useful technique.

In such a coating-type optical film, optical performance such as polarizing performance is however deteriorated with time, depending on the usage environment, in some cases.

Then, an object of the present invention is to solve the aforementioned problems which can be peculiarly generated in a coating-type optical film, and provide an optical film which hardly causes deterioration in optical performance with time, a display device equipped with the optical film, and a process for producing the optical film.

Means to Solve the Problems

The present invention provides the following preferable aspects [1] to [21].

[1] A polarizing plate comprising:
a diffusion preventing layer A having the thickness of 20 µm or less,
a polarizing film comprising a polymer of a polymerizable liquid crystal and a dichroic coloring matter, and
a diffusion preventing layer B having the thickness of 20 µm or less,
in this order.

[2] The polarizing plate according to claim 1, wherein the thickness of the diffusion preventing layers A and B is 0.05 µm to 3 µm, respectively.

[3] The polarizing plate according to claim 1 or 2, wherein at least one selected from the group consisting of the diffusion preventing layers A and B comprises a water-soluble polymer.

[4] The polarizing plate according to any one of claims 1 to 3, wherein the polymerizable liquid crystal is a thermotropic liquid crystal compound exhibiting a smectic phase.

[5] The polarizing plate according to claim 4, wherein the polarizing film comprises a polymer of a polymerizable liquid crystal obtained by polymerization in the state of a smectic phase.

[6] A polarizing plate with an adhesive layer, having a polarizing plate according to any one of claims 1 to 5, and an adhesive layer, wherein the polarizing plate has the adhesive layer on a side opposite to the polarizing film, of the diffusion preventing layer A or B of the polarizing plate.

[7] The polarizing plate according to any one of claims 1 to 6, wherein the thickness of at least one of the diffusion preventing layers A and B is 0.5 µm to 3 µm.

[8] A polarizing plate with a front plate, comprising a polarizing plate according to anyone of claims 1 to 5, and a front plate arranged on a side opposite to the polarizing film, of the diffusion preventing layer A or B of the polarizing plate.

[9] A polarizing plate with a front plate, comprising a polarizing plate with an adhesive layer according to claim 6, and a front plate arranged on a side opposite to the diffusion preventing layer A or B, of the adhesive layer of the polarizing plate with an adhesive layer.

The polarizing plate with a front plate according to claim 8 or 9, wherein the front plate has one or more patterning layers selected from the group consisting of the following (A) to (D), on at least one side thereof.
(A) Color filter layer
(B) TFT layer
(C) Transparent electrode layer
(D) Decorating layer

[11] An elliptic polarizing plate, equipped with a polarizing plate according to any one of claims 1 to 5, and a phase difference film on a side opposite to the polarizing film, of the diffusion preventing layer A or B of the polarizing plate.

[12] An elliptic polarizing plate, equipped with a polarizing plate with an adhesive layer according to claim 6, and a phase difference film on a side opposite to the diffusion preventing layer A or B, of the adhesive layer of the polarizing plate with an adhesive layer.

[13] An elliptic polarizing plate with a front plate, equipped with a polarizing plate with a front plate according to any one of claims 8 to 10, and a phase difference film on a side opposite to the polarizing film, of the diffusion preventing layer A or B of the polarizing plate with a front plate.

[14] The elliptic polarizing plate according to any one of claims 11 to 12, wherein the phase difference film satisfies the following expressions (1), (2) and (3):

$$Re(450)/Re(550) \leq 1.00 \quad (1)$$

$$1.00 \leq Re(650)/Re(550) \quad (2)$$

$$120 \leq Re(550) \leq 180 \quad (3)$$

[15] The elliptic polarizing plate with a front plate according to claim 13, wherein the phase difference film satisfies the following expressions (1), (2) and (3):

$$Re(450)/Re(550) \leq 1.00 \quad (1)$$

$$1.00 \leq Re(650)/Re(550) \quad (2)$$

$$120 \leq Re(550) \leq 180 \quad (3)$$

[16] An organic EL display device equipped with a polarizing plate according to any one of claims 1 to 5.

[17] A liquid crystal display device equipped with a polarizing plate according to any one of claims 1 to 5.

[18] A process for producing a polarizing plate with a front plate, comprising a step of transferring a polarizing plate according to any one of claims 1 to 5 onto a front plate.

[19] A process for producing a polarizing plate according to any one of claims 1 to 5, comprising the following steps of 1 to 3:
1. a step of forming a diffusion preventing layer A on a substrate;
2. a step of forming a polarizing film on the diffusion preventing layer A; and
3. a step of forming a diffusion preventing layer B on the polarizing film.

[20] A process for producing a polarizing plate according to any one of claims 1 to 5, comprising the following steps of 1 to 5:
1. a step of forming a diffusion preventing layer A on a substrate;
2. a step of forming a polarizing film on the diffusion preventing layer A;
3. a step of coating a diffusion preventing layer composition for forming a diffusion preventing layer B on the polarizing film or an adherend;
4. a step of sticking the polarizing film and an adherend via the diffusion preventing layer composition; and
5. a step of forming a diffusion preventing layer B by curing the diffusion preventing layer composition.

[21] A process for producing a polarizing plate according to any one of claims 1 to 5, comp rising the following steps of 1 to 8:
1. a step of forming a polarizing film on a substrate;
2. a step of coating a diffusion preventing layer composition (1) for forming a diffusion preventing layer B on the polarizing film or an adherend (1);
3. a step of sticking the polarizing film and the adherend (1) via the diffusion preventing layer composition (1);
4. a step of forming a diffusion preventing layer B by curing the diffusion preventing layer composition (1);
5. a step of removing the substrate;
6. a step of coating a diffusion preventing layer composition (2) for forming a diffusion preventing layer A on a surface of the polarizing film, from which the substrate has been removed, or on an adherend (2);
7. a step of sticking the surface of the polarizing film, from which the substrate has been removed, and the adherend (2) via the diffusion preventing layer composition (2); and
8. a step of forming a diffusion preventing layer A by curing the diffusion preventing layer composition.

Effect of the Invention

According to the present invention, there can be provided an optical film, optical performance of which is deteriorated little with time, a display device equipped with the optical film, and a process for producing the optical film.

DETAILED DESCRIPTION OF THE PREFERRED EMBODIMENTS

The polarizing plate of the present invention has a diffusion preventing layer A having the thickness of 20 µm, a polarizing film comprising a polymer of a polymerizable liquid crystal and a dichroic coloring matter, and a diffusion preventing layer B having the thickness of 20 µm, in this order.

Embodiments of the present invention will be illustrated in detail below. In addition, the scope of the present invention is not limited to embodiments illustrated herein, but can be variously altered in such a range that the gist of the present invention is not deteriorated.

<Polarizing Plate>

Figure 1:
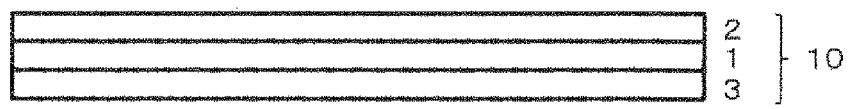
FIG. 1 represents across-sectional view of a configuration of a polarizing plate which is one aspect of the present invention.

A configuration in one embodiment of the polarizing plate of the present invention will be illustrated based on FIG. 1. The polarizing plate (10) of the present invention has a structure in which a diffusion preventing layer A (2) is laminated on one side of a polarizing film (1), and a diffusion preventing layer B (3) is laminated on the other side of the polarizing film (1). By having such a structure, since transfer of a dichroic coloring matter contained in the polarizing film to the outside of the film is suppressed, the polarizing plate of the present invention can suppress deterioration in optical performance of the polarizing plate with time, and can reduce the thickness thereof. Alternatively, an oriented film (not shown) may be laminated between the polarizing film (1) and the diffusion preventing layer. If necessary, the polarizing plate of the present invention may have an adhesive layer (not shown) on a side opposite to the polarizing film, of the diffusion preventing layer A. The adhesive layer has the function of sticking the polarizing plate and other member such as a front plate.

Figure 2:
FIG. 2 represents a cross-sectional view of a configuration of a polarizing plate with a front plate which is one aspect of the present invention.

In one embodiment of the present invention, the polarizing plate of the present invention may be equipped with a front plate (hereinafter, a polarizing plate equipped with a front plate is also referred to as "polarizing plate with a front plate"). This embodiment will be illustrated based on FIG. 2. The polarizing plate with a front plate (11) of the present invention may be equipped with a front plate (4) arranged on a side opposite to the polarizing film (1), and when the polarizing plate of the present invention is equipped with the adhesive layer, the polarizing plate with a front plate (11) of the present invention may be equipped with the front plate (4) arranged on a side opposite to the diffusion preventing layer A (2).

In one embodiment of the present invention, the polarizing plate of the present invention may be equipped with a phase difference film (hereinafter, a polarizing plate equipped with a phase difference film is also referred to as "elliptic polarizing plate"). The polarizing plate of the present invention may be equipped with the phase difference film on a side opposite to the polarizing film, of the diffusion preventing layer A. Additionally, when the polarizing plate of the present invention has the adhesive layer on a side opposite to the polarizing film, of the diffusion preventing layer A, the polarizing plate of the present invention may be equipped with the phase difference film on a side opposite to the diffusion preventing layer A, of the adhesive layer.

In one embodiment of the present invention, the polarizing plate of the present invention may be equipped with both of the front plate and the phase difference film. In this case, the phase difference film may be arranged on a side opposite to the polarizing film, of the diffusion preventing layer B of the polarizing plate with a front plate. The present invention is not limited to the above configurations, but an embodiment in which the diffusion preventing layer A is replaced with the diffusion preventing layer B in the illustration is also included in the present invention.

Each constituent element of the polarizing plate of the present invention will be illustrated in detail below.

<Polarizing Film>

The polarizing film in the present invention comprises a polymer of a polymerizable liquid crystal and a dichroic coloring matter, and is preferably a film in which the dichroic coloring matter is dispersed and oriented in a film composed of the polymer of a polymerizable liquid crystal. The polarizing film in the present invention is preferably a film obtained by curing the polymerizable liquid crystal in the state where the liquid crystal is oriented in a horizontal direction relative to a diffusion preventing layer plane. Horizontal orientation is orientation having a long axis of the polymerizable liquid crystal which is oriented in a direction parallel with a diffusion preventing layer plane. "Parallel" mentioned herein means an angle of 0°±20° relative to the diffusion preventing layer plane.

From a viewpoint of orientation of the polymerizable liquid crystal, the thickness of the polarizing film is preferably 0.5 μm to 3 μm, and more preferably 1 μm to 3 μm. When the thickness of the polarizing film is the lower limit value or more, since the polymerizable liquid crystal is hardly oriented in a vertical orientation direction, an orientation order tends to be improved. On the other hand, when the thickness of the polarizing film is the upper limit value or less, since the polymerizable liquid crystal is hardly oriented randomly, an orientation order tends to be improved. The thickness of the polarizing film can be measured with an interference thickness meter, a laser microscope or a contact-type thickness meter.

The polarizing film is usually obtained by coating a composition containing the polymerizable liquid crystal and the dichroic coloring matter (hereinafter, also referred to as "composition for forming a polarizing film") on a surface of a substrate, a diffusion preventing layer or an oriented film, and polymerizing the polymerizable liquid crystal. Herein, it is preferable that the polymerizable liquid crystal is polymerized in the state where the liquid crystal is oriented in a horizontal direction relative to a diffusion preventing layer plane.

[Polymerizable Liquid Crystal]

The polymerizable liquid crystal is a compound which has a polymerizable group and exhibits liquid crystallinity. The polymerizable group means a group involved in a polymerization reaction, and is preferably a photopolymerizable group. Herein, the photopolymerizable group refers to a group which can participate in a polymerization reaction by an active radical generated from a photopolymerization initiator described later or an acid and the like. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, an oxetanyl group and the like. Among them, an acryloyloxy group, a methacryloyloxy group, a vinyloxy group, an oxiranyl group and an oxetanyl group are preferable, and an acryloyloxy group is more preferable. Liquid crystallinity may be a thermotropic liquid crystal or a lyotropic liquid crystal.

The polymerizable liquid crystal may be a thermotropic liquid crystal compound exhibiting a nematic liquid crystal phase, or a thermotropic liquid crystal compound exhibiting a smectic liquid crystal phase. From a viewpoint that higher polarizing property is obtained, in the present invention, the polymerizable liquid crystal is preferably a thermotropic liquid crystal compound exhibiting a smectic liquid crystal phase, and more preferably a thermotropic liquid crystal compound exhibiting a high order smectic liquid crystal phase. Among them, a thermotropic liquid crystal compound exhibiting a smectic B phase, a smectic D phase, a smectic E phase, a smectic F phase, a smectic G phase, a smectic H phase, a smectic I phase, a smectic J phase, a smectic K phase or a smectic L phase is more preferable, and a thermotropic liquid crystal compound exhibiting a smectic B phase, a smectic F phase or a smectic I phase is further preferable. When the liquid crystal phase formed by the polymerizable liquid crystal is any of these high order smectic phases, the polarizing film having higher polarizing performance can be produced. Additionally, in such a polarizing film having high polarizing performance, a Bragg peak derived from a high order structure such as a hexatic phase and a crystal phase is obtained, in X-ray diffraction measurement. The Bragg peak is a peak derived from a periodic structure of molecular orientation, and a film having a periodic interval thereof of 3 to 6 Å can be obtained. From a viewpoint that higher polarizing property is obtained, it is preferable that the polarizing film of the present invention contains a polymer of a polymerizable liquid crystal, which was obtained by polymerizing this polymerizable liquid crystal in the smectic phase state.

Examples of such a compound include specifically a compound represented by the following formula (A) (hereinafter, referred to as compound (A) in some cases) and the like. The polymerizable liquid crystals may be used alone, or two or more kinds may be used by combining them.

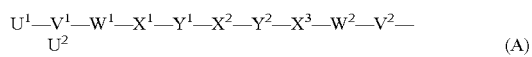
(A)

[in the formula (A), $X^1$, $X^2$ and $X^3$ represent independently of one another a 1,4-phenylene group optionally having a substituent or a cyclohexane-1,4-diyl group optionally having a substituent, provided that at least one of $X^1$, $X^2$ and $X^3$ is a 1,4-phenylene group optionally having a substituent. —$CH_2$— constituting a cyclohexane-1,4-diyl group may be replaced with —O—, —S— or —NR—. R represents an alkyl group of 1 to 6 carbon atoms or a phenyl group.

$Y^1$ and $Y^2$ represent independently of one another —$CH_2CH_2$—, —$CH_2O$—, —COO—, —OCOO—, a single bond, —N=N—, —$CR^a$=$CR^b$—, —C≡C— or —$Cr^a$=N—. $R^a$ and $R^b$ represent independently of one another a hydrogen atom or an alkyl group of 1 to 4 carbon atoms.

$U^1$ represents a hydrogen atom or a polymerizable group.
$U^2$ represents a polymerizable group.
$W^1$ and $W^2$ represent independently of one another a single bond, —O—, —S—, —COO— or —OCOO—.
$V^1$ and $V^2$ represent independently of one another an alkanediyl group of 1 to 20 carbon atoms optionally having a substituent, and —CH₂— constituting the alkanediyl group may be replaced with —O—, —S— or —NH—.]

In the compound (A), at least one of $X^1$, $X^2$ and $X^3$ is preferably a 1,4-phenylene group optionally having substituent. Herein, "optionally having a substituent" in the present specification has the same meaning as that of "non-substituted, or having a substituent".

A 1,4-phenylene group optionally having a substituent is preferably non-substituted. A cyclohexane-1,4-diyl group optionally having a substituent is preferably a trans-cyclohexane-1,4-diyl group optionally having a substituent, and a trans-cyclohexane-1,4-diyl group optionally having a substituent is preferably non-substituted.

Examples of a substituent which is arbitrarily possessed by a 1,4-phenylene group optionally having a substituent or a cyclohexane-1,4-diyl group optionally having a substituent include an alkyl group of 1 to 4 carbon atoms such as a methyl group, an ethyl group and a butyl group, a cyano group and a halogen atom.

$Y^1$ is preferably —CH₂CH₂—, —COO— or a single bond, and $Y^2$ is preferably —CH₂CH₂— or —CH₂O—.

$U^2$ is a polymerizable group. $U^1$ is a hydrogen atom or a polymerizable group, and preferably a polymerizable group. $U^1$ and $U^2$ are preferably both a polymerizable group, and more preferably both a photopolymerizable group. A polymerizable liquid crystal having a photopolymerizable group is advantageous in that it can be polymerized under the lower temperature condition.

Polymerizable groups represented by $U^1$ and $U^2$ may be different from one another, and are preferably the same.

Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, an oxetanyl group and the like. Among them, an acryloyloxy group, a methacryloyloxy group, a vinyloxy group, an oxiranyl group and an oxetanyl group are preferable, and an acryloyloxy group is more preferable.

Examples of the alkanediyl group represented by $V^1$ and $V^2$ include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,6-diyl group, a decane-1,10-diyl group, a tetradecane-1,14-diyl group and an icosane-1,20-diyl group. $V^1$ and $V^2$ are preferably an alkanediyl group of 2 to 12 carbon atoms, and more preferably an alkanediyl group of 6 to 12 carbon atoms.

Examples of a substituent which is arbitrarily possessed by an alkanediyl group of 1 to 20 carbon atoms optionally having a substituent include a cyano group and a halogen atom, and the alkanediyl group is preferably non-substituted, and is more preferably a non-substituted straight alkanediyl group.

$W^1$ and $W^2$ are independently of one another, preferably, a single bond or —O—.

Specific examples of the compound (A) include compounds represented by the formula (1-1) to the formula (1-23) and the like. When the compound (A) has a cyclohexane-1,4-diyl group, the cyclohexane-1,4-diyl group is preferably a trans isomer.

[Chemical formula 1]

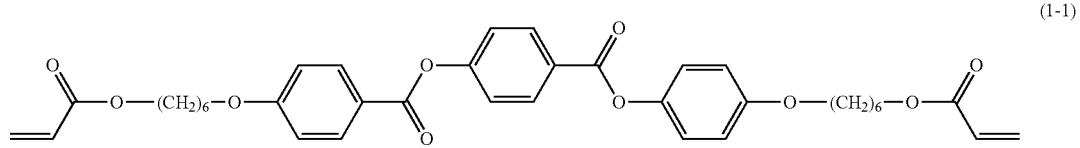

(1-1)

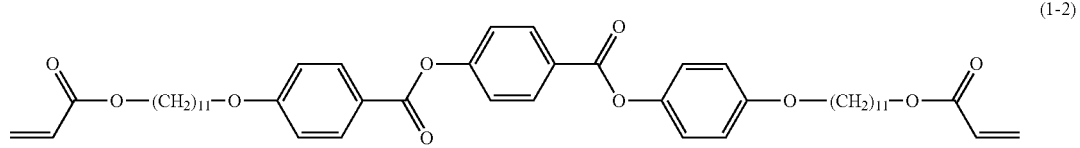

(1-2)

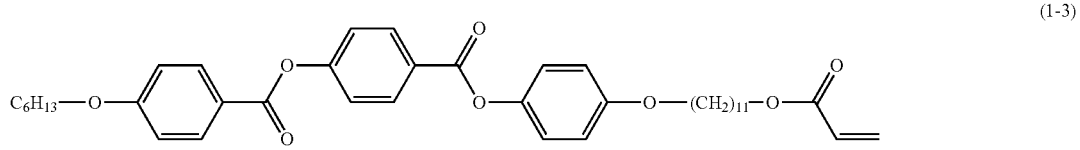

(1-3)

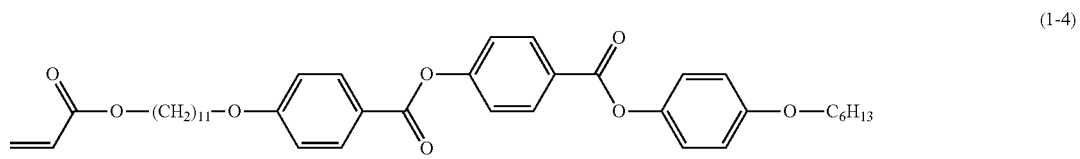

(1-4)

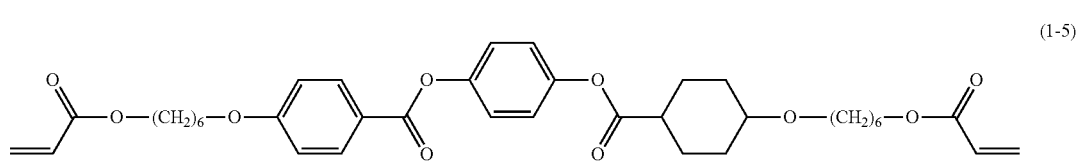

(1-5)

-continued
(1-6)
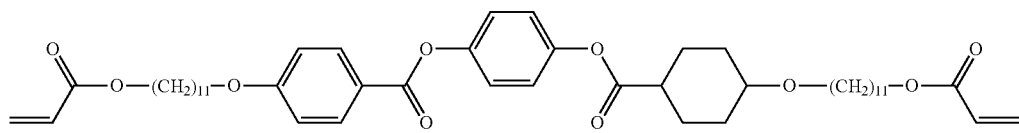
(1-7)
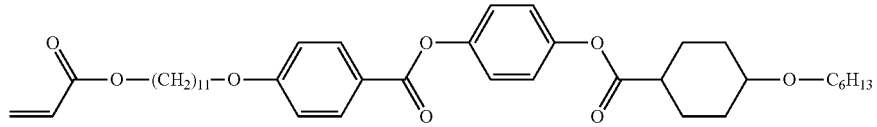
(1-8)
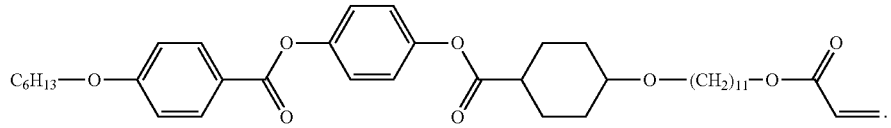
[Chemical formula 2]
(1-9)
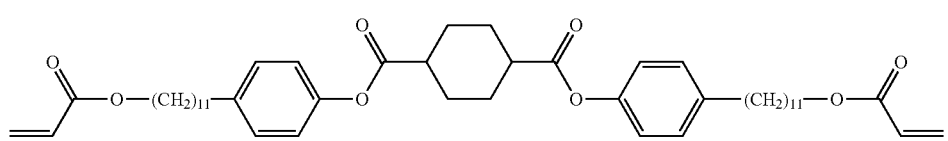
(1-10)
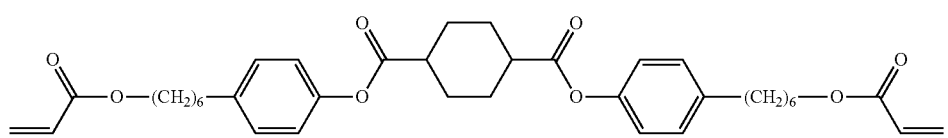
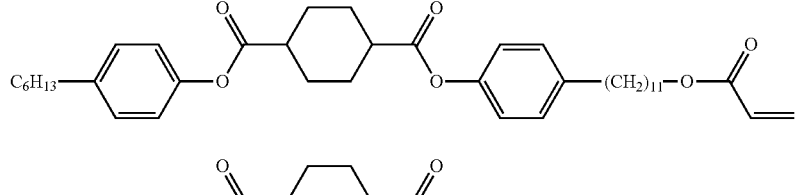
(1-11)
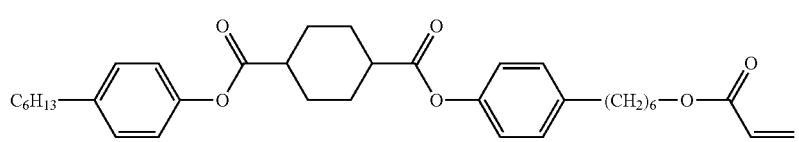
(1-12)
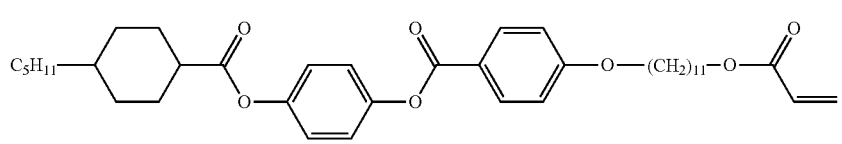
(1-13)
(1-14)
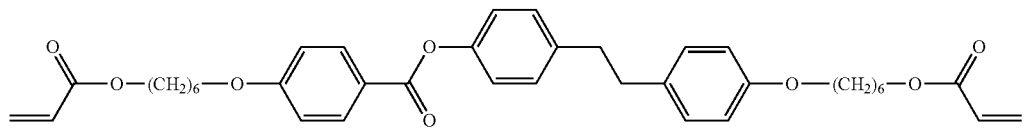
(1-15)
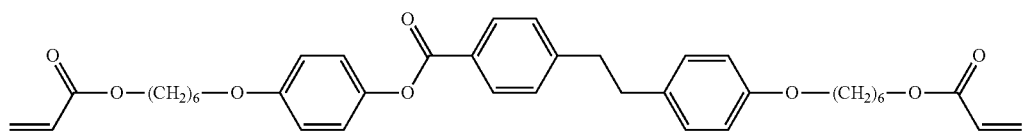

-continued

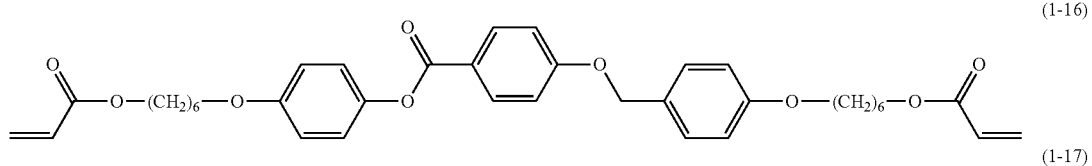
(1-16)

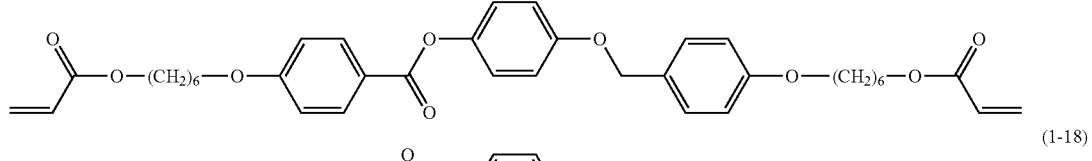
(1-17)

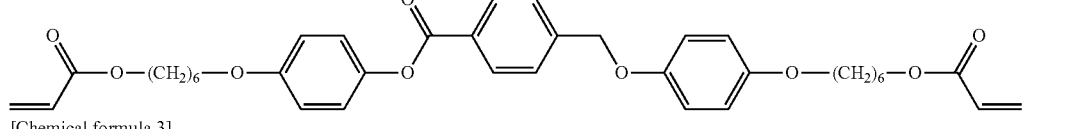
(1-18)

[Chemical formula 3]

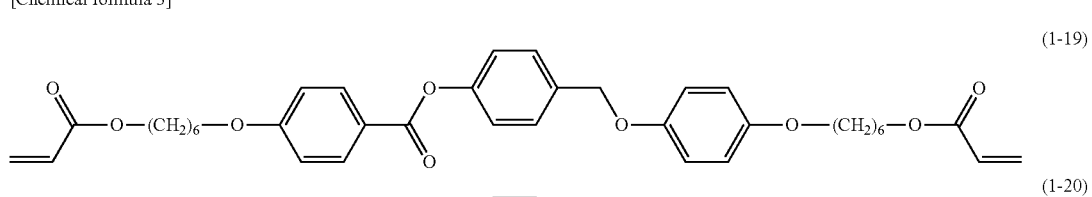
(1-19)

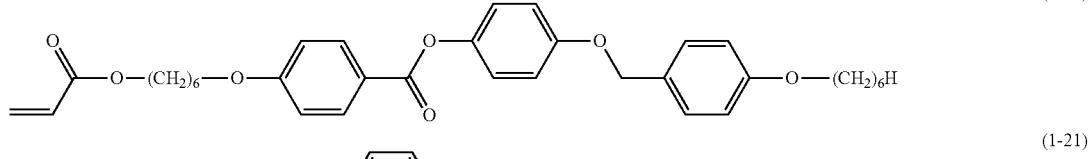
(1-20)

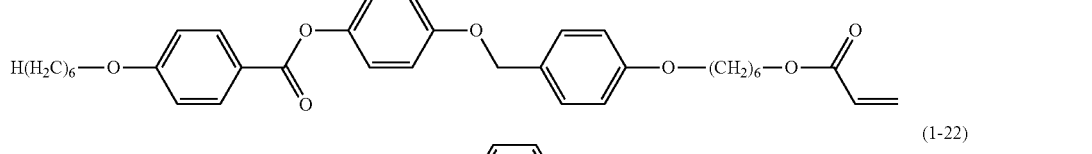
(1-21)

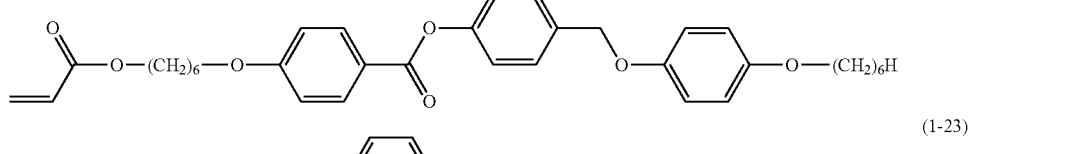
(1-22)

(1-23)

Among the exemplified compounds (A), at least one selected from the group consisting of the compounds represented by the formula (1-2), the formula (1-3), the formula (1-4), the formula (1-6), the formula (1-7), the formula (1-8), the formula (1-13), the formula (1-14) and the formula (1-15), respectively, is preferable.

The exemplified compounds (A) can be used in the polarizing film, alone or in combination thereof. Additionally, when two or more polymerizable liquid crystals are combined, it is preferable that at least one is the compound (A), and it is more preferable that two or more are the compound (A). By combining two or more polymerizable liquid crystals, liquid crystallinity can be temporarily retained even at a temperature of a liquid crystal-crystal phase transition temperature or lower, in some cases. A mixing ratio when two or more polymerizable liquid crystals are combined is usually 1:99 to 50:50, preferably 5:95 to 50:50 and more preferably 10:90 to 50:50.

The compound (A) is produced by the known methods described, for example, in Lub et al. Recl. Trav. Chim. Pays-Bas, 115, 321-328 (1996), or U.S. Pat. No. 4,719,156.

The content ratio of the polymerizable liquid crystal in the composition for forming a polarizing film is usually 70 to 99.5 parts by mass, preferably 80 to 99 parts by mass, more preferably 80 to 94 parts by mass, and further preferably 80 to 90 parts by mass, based on 100 parts by mass of the solid content of the composition for forming a polymerizing film. When the content ratio of the polymerizable liquid crystal is within the above range, orientability tends to increase. Herein, the solid content refers to the total amount of components obtained by removing a solvent from the composition for forming a polarizing film.

The composition for forming a polarizing film may contain a solvent, a polymerization initiator, a sensitizer, a polymerization inhibitor, a leveling agent and a reactive additive, as a component other than the polymerizable liquid crystal and the dichroic coloring matter.
[Dichroic Coloring Matter]

The dichroic coloring matter contained in the composition for forming a polarizing film refers to a coloring matter having a nature that the absorbance in along axis direction of a molecule and the absorbance in a short axis direction are different.

As the dichroic coloring matter, one having the absorption maximum wavelength (λ MAX) in the range of 300 to 700 nm is preferable. Examples of such a dichroic coloring matter include, for example, an acridine coloring matter, an oxazine coloring matter, a cyanine coloring matter, a naphthalene coloring matter, an azo coloring matter and an anthraquinone coloring matter, and among them, an azo coloring matter is preferable. Examples of the azo coloring matter include a monoazo coloring matter, a bisazo coloring matter, a trisazo coloring matter, a tetrakisazo coloring matter and a stilbene coloring matter, and preferably a bisazo coloring matter and a trisazo coloring matter. The dichroic coloring matters may be used alone, or two or more may be combined, and it is preferable to combine three or more. Particularly, it is more preferable to combine three or more azo compounds.

Examples of the azo coloring matter include, for example, a compound represented by the formula (B) (hereinafter, referred to as "compound (B)" in some cases).

$$A^1(-N=N-A^2)_p-N=N-A^3 \quad (B)$$

[in the formula (B), $A^1$ and $A^3$ represent independently of one another a phenyl group optionally having a substituent, a naphthyl group optionally having a substituent or a monovalent heterocyclic group optionally having a substituent. $A^2$ represents a 1,4-phenylene group optionally having a substituent, a naphthalenen-1,4-diyl group optionally having a substituent or a divalent heterocyclic group optionally having a substituent. And, p represents an integer of 1 to 4. When p is an integer of 2 or more, a plurality of $A^2$s may be the same or different from one another.]

Examples of the monovalent heterocyclic group include groups obtained by removing one hydrogen atom from a heterocyclic compound such as quinoline, thiazole, benzothiazole, thienothiazole, imidazole, benzimidazole, oxazole and benzoxazole. Examples of the divalent heterocyclic group include groups obtained by removing two hydrogen atoms from the aforementioned heterocyclic groups.

Examples of a substituent which is arbitrarily possessed by a phenyl group, a naphthyl group and a monovalent heterocyclic group in $A^1$ and $A^3$, as well as a p-phenylene group, a naphthalene-1,4-diyl group and a divalent heterocyclic group in $A^2$ include alkyl groups of 1 to 4 carbon atoms; alkoxy groups of 1 to 4 carbon atoms such as a methoxy group, an ethoxy group and a butoxy group; fluorinated alkyl groups of 1 to 4 carbon atoms such as a trifluoromethyl group; a cyano group; a nitro group; a halogen atom; substituted or non-substituted amino groups such as an amino group, a diethylamino group and a pyrrolidino group (A substituted amino group means an amino group having one or two alkyl groups of 1 to 6 carbon atoms, Or an amino group in which two substituted alkyl groups are mutually bound to form an alkanediyl group of 2 to 8 carbon atoms. A non-substituted amino group is —$NH_2$). In addition, specific examples of the alkyl group of 1 to 6 carbon atoms include a methyl group, an ethyl group, a butyl group and a hexyl group.

Among the compounds (B), compounds represented by the following formula (2-1) to formula (2-6), respectively, are preferable.

[Chemical formula 4]

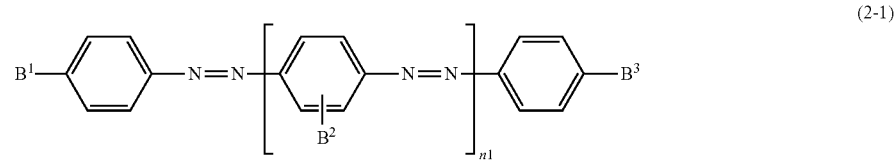

(2-1)

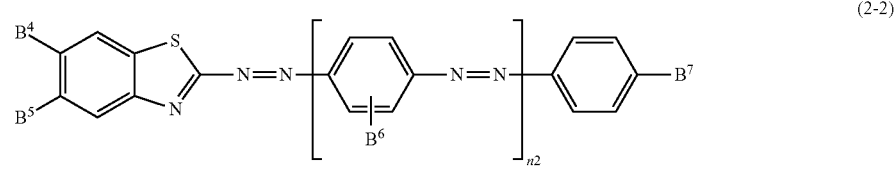

(2-2)

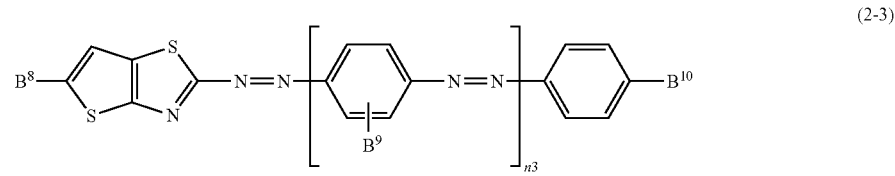

(2-3)

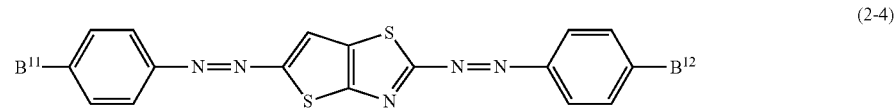

(2-4)

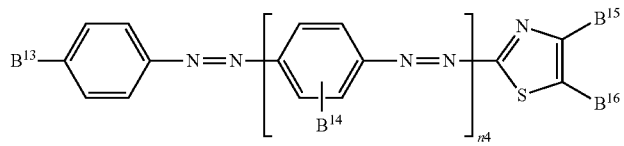

(2-5)

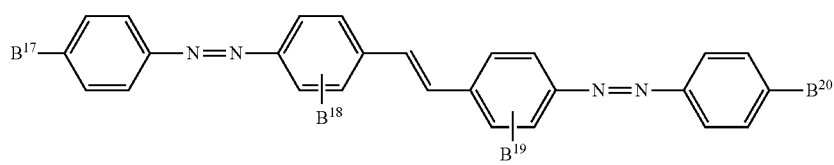

(2-6)

[in the formulas (2-1) to (2-6), $B^1$ to $B^{20}$ represent independently of one another a hydrogen atom, an alkyl group of 1 to 6 carbon atoms, an alkoxy group of 1 to 4 carbon atoms, a cyano group, a nitro group, a substituted or non-substituted amino group (definition of a substituted amino group and a non-substituted amino group is as described above), a chlorine atom or a trifluoromethyl group.

And, n1 to n4 represent, independently of one another, an integer of 0 to 3.

When n1 is 2 or more, a plurality of $B^2$s may be the same or different from one another, when n2 is 2 or more, a plurality of $B^6$s may be the same or different from one another, when n3 is 2 or more, a plurality of $B^9$s may be the same or different from one another, when n4 is 2 or more, a plurality of $B^{14}$s may be the same or different from one another.]

As the anthraquinone coloring matter, a compound represented by the formula (2-7) is preferable.

[Chemical formula 5]

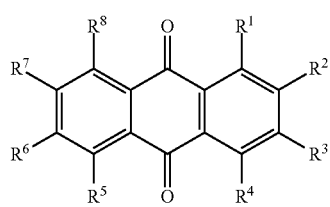

(2-7)

[in the formula (2-7), $R^1$ to $R^8$ represent independently of one another a hydrogen atom, $-R^x$, $-NH_2$, $-NHR^x$, $-NR^x_2$, $-SR^x$ or a halogen atom.

$R^x$ represents an alkyl group of 1 to 4 carbon atoms or an aryl group of 6 to 12 carbon atoms.]

As the oxazine coloring matter, a compound represented by the formula (2-8) is preferable.

[Chemical formula 6]

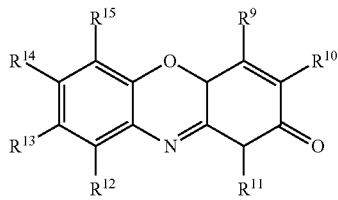

(2-8)

[in the formula (2-8), $R^9$ to $R^{15}$ represent independently of one another a hydrogen atom, $-R^x$, $-NH_2$, $-NHR^x$, $-NR^x_2$, $-SR^x$ or a halogen atom.

$R^x$ represents an alkyl group of 1 to 4 carbon atoms or an aryl group of 6 to 12 carbon atoms.]

As the acridine coloring matter, a compound represented by the formula (2-9) is preferable.

[Chemical formula 7]

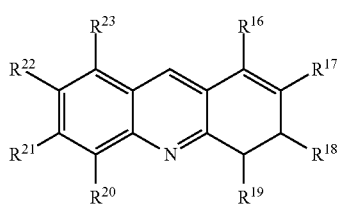

(2-9)

[in the formula (2-9), $R^{16}$ to $R^{23}$ represent independently of one another a hydrogen atom, $-R^x$, $-NH_2$, $-NHR^x$, $-NR^x_2$, $-SR^x$ or a halogen atom.

$R^x$ represents an alkyl group of 1 to 4 carbon atoms or an aryl group of 6 to 12 carbon atoms.]

Examples of the alkyl group of 1 to 4 carbon atoms represented by $R^x$, in the formula (2-7), the formula (2-8) and the formula (2-9) include a methyl group, an ethyl group, a propyl group, a butyl group, a pentyl group and a hexyl group, and examples of the aryl group of 6 to 12 carbon atoms include a phenyl group, a toluyl group, a xylyl group and a naphthyl group.

As the cyanine coloring matter, a compound represented by the formula (2-10) and a compound represented by the formula (2-11) are preferable.

[Chemical formula 8]

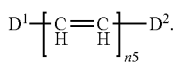
(2-10)

[in the formula (2-10), $D^1$ and $D^2$ represent independently of one another a group represented by any of the formula (2-10a) to the formula (2-10d).

[Chemical formula 9]

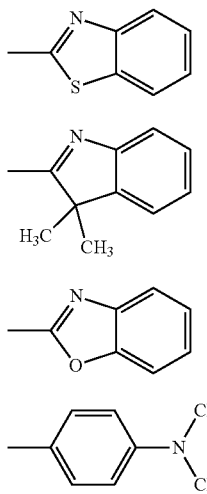

(2-10a)

(2-10b)

(2-10c)

(2-10d)

n5 represents an integer of 1 to 3.]

[Chemical formula 10]

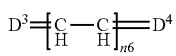
(2-11)

[in the formula (2-11), $D^3$ and $D^4$ represent independently of one another a group represented by any of the formula (2-11a) to the formula (2-11h).

[Chemical formula 11]

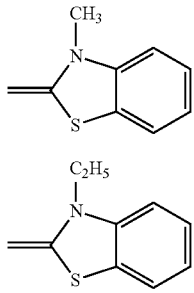

(2-11a)

(2-11b)

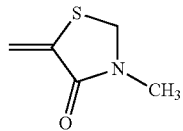
(2-11c)

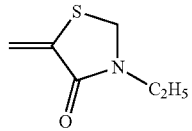
(2-11d)

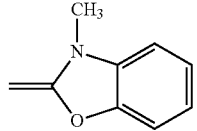
(2-11e)

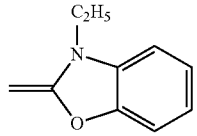
(2-11f)

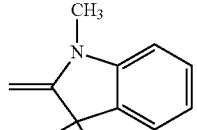
(2-11g)

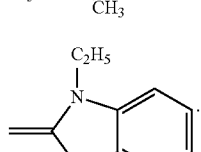
(2-11h)

n6 represents an integer of 1 to 3.]

The content of the dichroic coloring matter in the composition for forming a polarizing film is preferably 0.1 to 30 parts by mass, more preferably 0.1 to 20 parts by mass, and further preferably 0.1 to 10 parts by mass, based on the content of 100 parts by mass of the polymerizable liquid crystal. When the content of the dichroic coloring matter is within the above range, the polymerizable liquid crystal can be polymerized without disturbing orientation thereof. When the content of the dichroic coloring matter is too large, there is a possibility that orientation of the polymerizable liquid crystal is inhibited. For this reason, the content of the dichroic coloring matter can also be determined in such a range that the polymerizable liquid crystal can retain the liquid crystal state.

[Solvent]

The composition for forming a polarizing film may contain a solvent. As the solvent, a solvent which can completely dissolve the polymerizable liquid crystal is preferable, and a solvent which is inert to a polymerization reaction of the polymerizable liquid crystal is preferable.

Examples of the solvent include alcohol solvents such as methanol, ethanol, ethylene glycol, isopropyl alcohol, propylene glycol, ethylene glycol methyl ether, ethylene glycol butylether and propylene glycol monomethyl ether; ester solvents such as ethyl acetate, butyl acetate, ethylene glycol methyl ether acetate, γ-butyrolactone or propylene glycol methyl ether acetate and ethyl lactate; ketone solvents such as acetone, methyl ethyl ketone, cyclopentanone, cyclohexanone, 2-heptanone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; chlorine-containing solvents such as chloroform and chlorobenzene; and the like. These solvents may be used alone, or may be used by combining two or more of them.

The content of the solvent is preferably 50 to 98% by mass based on the total amount of the composition for forming a polarizing film. In other words, the content of the solid content in the composition for forming a polarizing film is preferably 2 to 50% by mass. When the content of the solid content is 50% by mass or less, since the viscosity of the composition forming a polarizing film is reduced, the thickness of the polarizing film becomes approximately uniform, thereby, there is a tendency that unevenness of the polarizing film is hardly generated. Additionally, the content of such a solid content can be determined, in view of the thickness of the polarizing film to be produced.

[Polymerization Initiator]

The composition for forming a polarizing film may contain a polymerization initiator. The polymerization initiator is a compound which can initiate a polymerization reaction of the polymerizable liquid crystal or the like. As the polymerization initiator, a photopolymerization initiator which generates an active radical by the action of light is preferable.

Examples of the polymerization initiator include, for example, a benzoin compound, a benzophenone compound, an alkylphenone compound, an acylphosphine oxide compound, a triazine compound, an iodonium salt and a sulfonium salt.

Examples of the benzoin compound include, for example, benzoin, benzoin methyl ether, benzoin ethyl ether, benzoin isopropyl ether and benzoin isobutyl ether.

Examples of the benzophenone compound include, for example, benzophenone, methyl o-benzoylbenzoate, 4-phenylbenzophenonne, 4-benzoyl-4'-methyldiphenyl sulfide, 3,3',4,4'-tetra(tert-butylperoxycarbonyl)-benzophenone and 2,4,6-trimethylbenzophenone.

Examples of the alkylphenone compound include, for example, diethoxyacetophenone, 2-methyl-2-morpholino-1-(4-methylthiophenyl)propane-1-one, 2-benzyl-2-dimethylamino-1-(4-morpholinophenyl)butane-1-one, 2-hydroxy-2-methyl-1-phenylpropane-1-one, 1,2-diphenyl-2,2-dimethoxyethane-1-one, 2-hydroxy-2-methyl-1-[4-(2-hydroxyethoxy)phenyl]propane-1-one, 1-hydroxycyclohexyl phenyl ketone and an oligomer of 2-hydroxy-2-methyl-1-[4-(1-methylvinyl)phenyl]propane-1-one.

Examples of the acylphosphine oxide compound include 2,4,6-trimethylbenzoyldiphenylphosphine oxide and bis(2,4,6-trimethylbenzoyl)phenylphosphine oxide.

Examples of the triazine compound include, for example, 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine, As the polymerization initiator, a commercially available polymerization initiator can be used. Examples of the commercially available polymerization initiator include Irgacure (registered trademark) 907, 184, 651, 819, 250, and 369 (produced by Ciba Specialty Chemicals Co., Ltd.); SEIKUOL (registered trademark) BZ, Z and BEE (produced by Seiko Chemical Co., Ltd.); Kayacure (registered trademark) BP100, and UVI-6992 (produced by The Dow Chemical Company); Adekaopto SP-152, and SP-170 (produced by ADEKA); TAZ-A, and TAZ-PP (produced by ADEKA CORPORATION), as well as TAZ-A, and TAZ-PP (produced by DKSH Japan K. K.), as well as TAZ-104 (produced by Sanwa Chemical Co., Ltd.); and the like.

The content of the polymerization initiator in the composition for forming a polarizing film can be appropriately adjusted, depending on a kind and an amount of the polymerizable liquid crystal, and is usually 0.1 to 30 parts by mass, preferably 0.5 to 10 parts by mass, and more preferably 0.5 to 8 parts by mass, based on the content of 100 parts by mass of the polymerizable liquid crystal. When the content of the polymerization initiator is within the above range, polymerization can be performed without disturbing orientation of the polymerizable liquid crystal.

[Sensitizer]

The composition for forming a polarizing film may contain a sensitizer. As the sensitizer, a photosensitizer is preferable. Examples of the sensitizer include xanthone compounds such as xanthone and thioxanthone (e.g. 2,4-diethylthioxanthone, 2-isopropylthioxanthone etc.); anthracene compounds such as anthracene and alkoxy group-containing anthracene (e.g. dibutoxyanthracene etc.); phenothiazine and rubrene, and the like.

When the composition for forming a polarizing film contains the sensitizer, a polymerization reaction of the polymerizable liquid crystal contained in the composition for forming a polarizing film can be more promoted. A use amount of such a sensitizer is preferably 0.1 to 30 parts by mass, more preferably 0.5 to 10 parts by mass, and further preferably 0.5 to 8 parts by mass, based on the content of 100 parts by mass of the polymerizable liquid crystal.

[Polymerization Inhibitor]

From a viewpoint that a polymerization reaction is stably progressed, the composition for firming a polymerizing film may contain a polymerization inhibitor. A progression degree of a polymerization reaction of the polymerizable liquid crystal can be controlled by the polymerization inhibitor.

Examples of the polymerization inhibitor include, for example, radical scavengers such as hydroquinone, alkoxy group-containing hydroquinone, alkoxy group-containing catechol (e.g. butylcatechol etc.), pyrogallol, and 2,2,6,6-tetramethyl-1-piperidinyloxy radical; thiophenols; β-naphthylamines and β-naphthols.

When the composition for forming a polarizing film contains the polymerization inhibitor, the content of the polymerization inhibitor is preferably 0.1 to 30 parts by mass, more preferably 0.5 to 10 parts by mass, and further preferably 0.5 to 8 parts by mass, based on the content of 100 parts by mass of the polymerizable liquid crystal. When the content of the polymerization inhibitor is within the above range, polymerization can be performed without disturbing orientation of the polymerizable liquid crystal.

[Leveling Agent]

The composition for forming a polarizing film may contain a leveling agent. The leveling agent adjusts flowability of the composition for forming a polarizing film, and has the function of more flattening a film obtained by coating the composition for forming a polarizing film, and examples thereof include, for example, a surfactant. Examples of the preferable leveling agent include a leveling agent containing, as a main component, a polyacrylate compound such as "BYK-361N" (produced by BYK Chemie), and a leveling agent containing, as a main component, a fluorine-containing compound such as Surflon (registered trademark) "S-381" (produced by AGC Seimi Chemical Co., Ltd.).

When the composition for forming a polarizing film contains the leveling agent, the content thereof is preferably 0.1 to 5 parts by mass, more preferably 0.3 to 5 parts by mass, and further preferably 0.5 to 3 parts by mass, based on the content of 100 parts by mass of the polymerizable liquid crystal. When the content of the leveling agent is within the above range, it is easy to horizontally orient the polymerizable liquid crystal, and there is a tendency that the resulting polarizing film becomes more smooth. When the content of the levering agent relative to the polymerizable liquid crystal exceeds the above range, there is a tendency that unevenness is easily generated in the resulting polarizing film. In addition, the composition for forming a polarizing film may contain two or more leveling agents.

[Reactive Additive]

The composition for forming a polarizing film may contain a reactive additive. As the reactive additive, a reactive additive having a carbon-carbon unsaturated bond and an active hydrogen reactive group in a molecule is preferable. In addition, the "active hydrogen reactive group" mentioned herein means a group having reactivity with a group having active hydrogen such as a carboxyl group (—COOH), a hydroxy group (—OH), and an amino group (—NH$_2$), and representative examples thereof are a glycidyl group, an oxazoline group, a carbodiimide group, an aziridine group, an imide group, an isocyanate group, a thioisocyanate group, and maleic anhydride group. The number of carbon-carbon unsaturated bonds and active hydrogen reactive groups possessed by the reactive additive is usually 1 to 20, respectively, and preferably 1 to 10, respectively.

It is preferable that at least two active hydrogen reactive groups exist in the reactive additive, and in this case, a plurality of active hydrogen reactive groups may be the same or different.

The carbon-carbon unsaturated bond possessed by the reactive additive may be a carbon-carbon double bond or a carbon-carbon triple bond, or a combination thereof, and a carbon-carbon double bond is preferable. Among them, it is preferable that the reactive additive contains a carbon-carbon unsaturated bond as a vinyl group and/or a (meth) acryl group. Furthermore, the reactive additive in which an active hydrogen reactive group is at least one kind selected from the group consisting of an epoxy group, a glycidyl group and an isocyanate group is preferable, and the reactive additive having an acryl group and an isocyanate group is more preferable.

Specific examples of the reactive additive include compounds having a (meth)acryl group and an epoxy group, such as methacryloxy glycidyl ether and acryloxy glycidyl ether; compounds having a (meth)acryl group and an oxetane group, such as oxetane acrylate and oxetane methacrylate; compounds having a (meth)acryl group and a lactone group, such as lactone acrylate and lactone methacrylate; compounds having a vinyl group and an oxazoline group, such as vinyloxazoline and isopropenyloxazoline; an oligomer of compounds having a (meth)acryl group and an isocyanate group, such as isocyanatomethyl acrylate, isocyanatomethyl methacrylate, 2-isocyanatoethyl acrylate and 2-isocyanatoethyl methacrylate, and the like. In addition, examples include compounds having a vinyl group or a vinylene group and an acid anhydride, such as methacrylic anhydride, acrylic anhydride, maleic anhydride and vinyl maleic anhydride. Among them, methacryloxy glycidyl ether, acryloxy glycidyl ether, isocyanatomethyl acrylate, isocyanatomethyl methacrylate, vinyloxazoline, 2-isocyanatoethyl acrylate, 2-icocyanatoethyl methacrylate and the oligomer are preferable, and isocyanatomethyl acrylate, 2-isocyanatoethyl acrylate and the oligomer are particularly preferable.

Specifically, a compound represented by the following formula (Y) is preferable.

[Chemical formula 12]

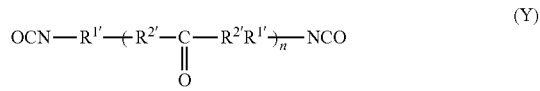

(Y)

[in the formula (Y), n represents an integer of 1 to 10, $R^{1'}$ represents a divalent aliphatic or alicyclic hydrocarbon group of 2 to 20 carbon atoms, or a divalent aromatic hydrocarbon group of 5 to 20 carbon atoms. Two $R^{2'}$ s at each repetition unit are such that one of them is —NH—, and the other is a group shown by >N—C(=O)—$R^{3'}$. $R^{3'}$ represents a hydroxy group or a group having a carbon-carbon unsaturated bond.

Among $R^{3'}$'s in the formula (Y), at least one $R^{3'}$ is a group having a carbon-carbon unsaturated bond.]

Among the reactive additives represented by the formula (Y), a compound represented by the following formula (YY) (hereinafter, referred to as compound (YY) in some cases) is particularly preferable (In addition, n has the same meaning as that described above).

[Chemical formula 13]

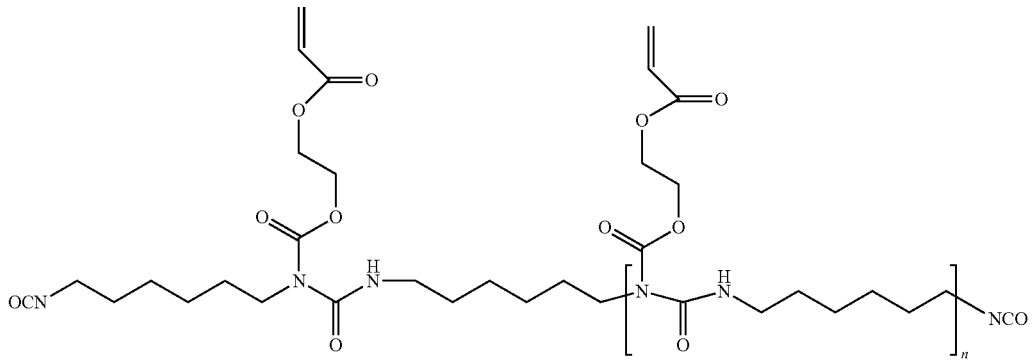

(YY)

As the compound (YY), a commercially available product can be used as it is, or can be used by purifying it, if necessary. Examples of the commercially available product include Laromer (registered trademark), LR-9000 (produced by Company BASF).

When the composition for forming a polarizing film contains the reactive additive, the content of the reactive additive is usually 0.01 to 10 parts by mass, and preferably 0.1 to 5 parts by mass, based on 100 parts by mass of the polymerizable liquid crystal.

<Oriented Film>

In the present invention, an oriented film is a film consisting of a polymer compound, and has an orientation regulating force which liquid crystal-orients the polymerizable liquid crystal in a desired direction.

The oriented film makes liquid crystal orientation of the polymerizable liquid crystal easy. The state of crystal liquid molecular orientation such as horizontal orientation, vertical orientation, hybrid orientation, and inclined orientation changes depending on a nature of the oriented film and the polymerizable liquid crystal, and a combination thereof can be arbitrarily selected. For example, when the oriented film is a material which manifests horizontal orientation as an orientation regulating force, the polymerizable liquid crystal can form horizontal orientation or hybrid orientation, and when the oriented film is a material which manifests vertical orientation, the polymerizable liquid crystal can form vertical orientation or inclined orientation. Expression of horizontal, vertical or the like represents a direction of a long axis of an oriented polymerizable liquid crystal, based on a polarizing film plane. Horizontal orientation is orientation having a long axis of the polymerizable liquid crystal which is oriented in a direction parallel with a polarizing film plane. "Parallel" mentioned herein means an angle of 0°±20° relative to a polarizing film plane. Vertical orientation is orientation having a long axis of the polymerizable liquid crystal which is oriented in a direction vertical to a polarizing film plane. Vertical mentioned herein means 90°±20° relative to a polarizing film plane.

When the oriented film is formed of an orientable polymer, the orientation regulating force can be arbitrarily adjusted by the surface state or the rubbing condition, and when the oriented film is formed of a photo-orientable polymer, the orientation regulating force can be arbitrarily adjusted by the polarized light irradiation condition or the like. Alternatively, liquid crystal orientation can also be controlled, by selecting physical properties such as a surface tension and liquid crystallinity, of the polymerizable liquid crystal.

As the oriented film which is formed between the diffusion preventing layer and the polarizing film, an oriented film which is insoluble in a solvent used upon formation of the polarizing film on the oriented film, and has heat resistance in heat treatment for removing a solvent or orienting a liquid crystal is preferable. Example of the oriented film include an oriented film, a photo-oriented film and a groove oriented film, each consisting of an orientable polymer, preferably a photo-oriented film.

The thickness of the oriented film is usually in the range of 10 nm to 500 nm, preferably in the range of 10 nm to 200 nm, and more preferably in the range of 30 to 100 nm.

Examples of the orientable polymer include a polyamide and gelatins having an amide bond in a molecule, a polyamide having an imide bond in a molecule, and polyamic acid being a hydrolysate thereof, polyvinyl alcohol, alkyl-modified polyvinyl alcohol, polyacrylamide, polyoxazole, polyethyleneimine, polystyrene, polyvinylpyrrolidone, polyacrylic acid and polyacrylic acid esters, and the like. Among them, polyvinyl alcohol is preferable. These orientable polymers may be used alone, or two or more may be used by combining them.

The oriented film consisting of the orientable polymer is usually obtained by coating a composition obtained by dissolving the orientable polymer in a solvent (hereinafter, also referred to as "orientable polymer composition") on the diffusion preventing layer, and removing the solvent, or coating the orientable polymer composition on the diffusion preventing layer, and removing the solvent, followed by rubbing (rubbing method).

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ethyl acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; chlorine-substituted hydrocarbon solvents such as chloroform and chlorobenzene; and the like. These solvents may be used alone, or two or more may be used by combining them.

The concentration of the orientable polymer in the orientable polymer composition is enough as long as the orientable polymer can be completely dissolved in a solvent, and the concentration in solid content equivalent is preferably 0.1 to 20% by mass, and more preferably 0.1 to 10% by mass, based on the solution.

As the orientable polymer composition, a commercially available oriented film material may be used as it is. Examples of the commercially available oriented film material include SUNEVER (registered trademark) (produced by Nissan Chemical Industries, Ltd.) and OPTOMER (registered trademark) (produced by JSR Corporation).

Examples of a method of coating the orientable polymer composition on the diffusion preventing layer include the known methods such as a coating method such as a spin coating method, an extrusion method, a gravure coating method, a die coating method, a bar coating method and an applicator method, and a printing method such as a flexographic method. When the polarizing plate of the present invention is produced by a Roll-to-Roll type continuous producing method, as the relevant coating method, a gravure coating method, a die coating method or a printing method such as a flexographic method is adopted.

By removing the solvent contained in the orientable polymer composition, the dried film of the orientable polymer is formed. Examples of a method of removing the solvent include a natural drying method, a forced-air drying method, a heated-air drying method and a reduced pressure drying method.

Examples of the rubbing method include a method of contacting a film of the orientable polymer, which was formed on a surface of the diffusion preventing layer by coating the orientable polymer composition on the diffusion preventing layer, followed by annealing, with a rotating rubbing roll on which a rubbing cloth is wound.

The photo-oriented film is usually obtained by coating a composition containing a polymer or a monomer having a photoreactive group and a solvent (hereinafter, also referred to as "composition for forming a photo-oriented film") on the diffusion preventing layer, and irradiating polarized light (preferably, polarized UV). The photo-oriented film is more preferable in that a direction of the orientation regulating force can be arbitrarily controlled, by selecting a polarization direction of polarized light to be irradiated.

The photoreactive group refers to a group which generates the liquid crystal orienting ability by irradiating light. Specifically, the group generates a photoreaction being the origin of the liquid crystal orienting ability, such as an orientation induction or isomerization reaction, a dimerization reaction, a photocrosslinking reaction, and a photodegradation reaction, of a molecule, which is generated by irradiating light. Among the photoreactive group, a group causing a dimerization reaction or a photocrosslinking reaction is preferable in that orientability is excellent. As the photoreactive group which can generate the above reaction, a group having an unsaturated bond, particularly, a double bond is preferable, and a group having at least one selected from the group consisting of a carbon-carbon double bond (C=C bond), a carbon-nitrogen double bond (C=N bond), a nitrogen-nitrogen double bond (N=N bond), and a carbon-oxygen double bond (C=O bond) is more preferable.

Examples of the photoreactive group having a C=C bond include a vinyl group, a polyene group, a stilbene group, a stilbazole group, a stilbazolim group, a chalcone group and a cinnamoyl group. Examples of the photoreactive group having a C=N bond include a group having a structure such as aromatic Schiff's base and aromatic hydrazone. Examples of the photoreactive group having an N=N bond include an azobenzene group, an azonaphthalene group, an aromatic heterocyclic azo group, a bisazo group and a formazan group, and a group containing azoxybenzene as a basic structure. Examples of the photoreactive group having a C=O bond include a benzophenone group, a coumarine group, an anthraquinone group and a maleimide group. These groups may have a substituent such as an alkyl group, an alkoxy group, an aryl group, an allyloxy group, a cyano group, an alkoxycarbonyl group, a hydroxyl group, a sufonic acid group and a halogenated alkyl group.

As a solvent of the composition for forming a photo-oriented film, a solvent which dissolves a polymer and a monomer having a photoreactive group is preferable, and examples of the solvent include, for example, solvents mentioned as the solvent of the orientable polymer composition.

The content of the polymer or the monomer having a photoreactive group relative to the composition for forming a photo-oriented film can be appropriately regulated depending on a kind of the polymer or the monomer having the photoreactive group and the thickness of the photo-oriented film to be produced, and is preferably 0.2% by mass or more, and particularly preferably in the range of 0.3 to 10% by mass. Additionally, a polymer material such as polyvinyl alcohol and polyimide, and a photosensitizer may be contained in such a range that properties of the photo-oriented film are not remarkably deteriorated.

Examples of a method of coating the composition for forming a photo-oriented film on the diffusion preventing layer include the same methods as those for coating the orientable polymer composition on the diffusion preventing layer. Examples of a method of removing the solvent from the coated composition for forming a photo-oriented film include, for example, the same methods as those for removing the solvent from the orientable polymer composition.

For irradiating polarized light, a type of directly irradiating polarized light to the composition for forming a photo-oriented film coated on the diffusion preventing layer or the like, from which the solvent has been removed, or a type of irradiating polarized light from a diffusion preventing layer side, and irradiating transmitted polarized light may be adopted. Additionally, the relevant polarized light is particularly preferably substantially parallel light. The wavelength of polarized light to be irradiated should be in such a wavelength region that a photoreactive group of the polymer or the monomer having a photoreactive group can absorb the light energy. Specifically, UV (ultraviolet light) in the range of the wavelength 250 to 400 nm is particularly preferable. Examples of a light source used in the polarized light irradiation include a xenon lamp, a high pressure mercury lamp, an ultrahigh pressure mercury lamp, a metal halide lamp, and an ultraviolet laser such as KrF and ArF, and a high pressure mercury lamp, an ultrahigh pressure mercury lamp and a metal halide lamp are more preferable. These lamps are preferable since a light emitting intensity of ultraviolet light of the wavelength of 313 nm is high. Polarized light can be irradiated by passing light from the light source through an appropriate polarizer, followed by irradiation. As such a polarizer, a polarizing filter, a polarizing prism such as Glan-Thompson, and Glan-Taylor, and a wire grid type polarizer can be used.

In addition, when rubbing or polarized light irradiation is performed, if masking is conducted, a plurality of regions in which directions of liquid crystal orientation are different (pattern) can also be formed.

A groove oriented film is a film having an irregular pattern or a plurality of grooves on a film surface. When a liquid crystal molecule is placed on a film having a plurality of straight grooves arranged at an equal interval, liquid crystal molecules are oriented in directions along the grooves.

Examples of a method of obtaining the groove oriented film include a method of performing exposure via a mask for exposure having a pattern-shaped slit on a surface of a photosensitive polyimide film, thereafter, performing development and rinse treatment to form an irregular pattern, a method of forming a layer of an UV curable resin before curing, on a plate-like master having grooves on a surface, transferring the resin layer onto a diffusion preventing layer, followed by curing, and a method of pushing a roll-like master having a plurality of grooves, against an UV curable resin before curing, which was formed on the diffusion preventing layer, to form irregularities, followed by curing. Specifically, examples thereof include the methods described in JP-A-6-34976 and JP-A-2011-242743.

In order to obtain orientation having little orientation disorder, the width of a convex portion of the groove oriented film is preferably 0.05 μm to 5 μm, the width of a concave portion is preferably 0.1 μm to 5 μm, and the depth of an irregular level difference is preferably 2 μm or less, and preferably 0.01 μm to 1 μm or less.

<Diffusion Preventing Layers A and B>

The polarizing plate of the present invention has a diffusion preventing layer (diffusion preventing layer A) on one side of the polarizing film and another diffusion preventing layer (diffusion preventing layer B) on the other side, respectively. The polarizing plate of the present invention is preferably such that the diffusion preventing layer A or B is contacted with the polarizing film, and more preferably such that both of the diffusion preventing layers A and B are contacted with the polarizing film. The diffusion preventing layers A and B are a layer which can suppress transfer of the dichroic coloring matter from the polarizing film, and as a result, deterioration in polarizing performance of the polarizing film with time can be suppressed. The diffusion preventing layers A and B are capable of reducing the thickness of the polarizing plate.

Additionally, the polarizing plate of the present invention has the diffusion preventing layers A and B, thereby, when the polarizing plate of the present invention is laminated on other member (adherend), even if other member has a level difference (irregularity) in a shape, variation in the film thickness of the polarizing film can be reduced, and accordingly, uniform polarizing performance in the film can be obtained. In the present specification, the adherend means a member which is transferred when the polarizing plate is transferred from a substrate, and a member which is laminated when the polarizing plate is laminated without being transferred. Examples of such a member include a member to which the polarizing plate is applied, such as a front plate and a phase difference film.

Furthermore, it is preferable that diffusion preventing layers A and B contribute to prevention of shrinkage and expansion of the polarizing film, as well as prevention of deterioration in the polarizing film due to a temperature, humidity, an ultraviolet ray, and the like.

As a material constituting the diffusion preventing layers A and B, a material excellent in solvent resistance, transparency, the mechanical strength, heat stability, shielding property, and isotropy is preferable. The material is enough as long as it has at least transparency which can endure use as an optical film, and the diffusion preventing ability to suppress transfer of the dichroic coloring matter.

It is preferable that the diffusion preventing layers A and B having the function of preventing transfer (diffusion) of the dichroic coloring matter are composed of a material having low compatibility with the dichroic coloring matter. Examples of such a material include a photocurable resin and a water-soluble polymer. Since the photocurable resin is highly polymerized, it can prevent diffusion of the dichroic coloring matter, and since the water-soluble polymer has greatly different polarity from that of the dichroic coloring matter, it can prevent diffusion of the dichroic coloring matter.

It is preferable that at least one selected from the group consisting of the diffusion preventing layers A and B contains specifically a water-soluble polymer such as a polyacrylamide-based polymer; a vinyl alcohol-based polymer such as polyvinyl alcohol, and an ethylene-vinyl alcohol copolymer; a carboxyvinyl-based polymer; polyvinylpyrrolidone; starches; sodium alginate; or a polyethylene oxide-based polymer Additionally, it is preferable that at least one selected from the group consisting of the diffusion prevention layers A and B contains an acrylic-based, urethane-based, acrylic urethane-based, epoxy-based, or silicone-based photocurable resin.

From a viewpoint that the function of shielding the dichroic coloring matter in the polarizing film is more excellent, inter alia, it is preferable that at least one selected from the group consisting of the diffusion preventing layers A and B contains a water-soluble polymer, and it is more preferable that the diffusion preventing layers A, and B each contain a water-soluble polymer. A material constituting the diffusion preventing layer A and a material constituting the diffusion preventing layer B may be the same or different. Additionally, the diffusion preventing layer A and the diffusion preventing layer B may be the same or different. In the present specification, there is simply described "diffusion preventing layer" in some cases, and this means that the diffusion preventing layer may be either of the diffusion preventing layer A or the diffusion preventing layer B.

The content of the aforementioned polymers in the diffusion preventing layers A and B is preferably 90% by mass or more, more preferably 95% by mass or more, and further preferably 99% by mass or more. Additionally, the diffusion preventing layers A and B may contain the aforementioned polymers alone, or may contain two or more by combining them.

A glass transition temperature of the diffusion preventing layers A and B is preferably higher than 25° C. (room temperature), and preferably 40° C. or higher. Additionally, a glass transition temperature of the polymer constituting the diffusion preventing layer A or B is preferably 25° C. (room temperature) or higher, and preferably 40° C. or higher. That is, it is preferable that the diffusion preventing layers A and B are a layer which has been cured at room temperature. Such a layer can prevent diffusion of the dichroic coloring matter to the diffusion preventing layers A and B, and can decrease deterioration in optical performance of the polarizing plate of the present invention with time.

Additionally, the content of a low molecule having a molecular weight of 1000 or less in the diffusion preventing layers A and B is preferably 1% by mass or less, and more preferably 0.1% by mass or less. Such a layer can prevent diffusion of the dichroic coloring matter to the diffusion preventing layers A and B, and can decrease deterioration in optical performance of the polarizing plate of the present invention with time.

It is preferable that the diffusion preventing layers A and B are layers which each exhibit good adhesiveness to an adherend, can adhere the polarizing plate of the present invention to a desired region, and are used in laminating the polarizing plate of the present invention. According to such diffusion preventing layers A and B, since the polarizing plate can be directly laminated on an adherend, reduction in the thickness of the resulting laminate can be achieved. Examples of the polymer constituting the diffusion preventing layer, which exhibits adhesiveness to an adherend, include a mixed composition of a vinyl alcohol-based polymer and at least one crosslinking agent selected from the group consisting of an epoxy-based crosslinking agent, an amide-based crosslinking agent and an acrylic-based crosslinking agent.

The thickness of the diffusion preventing layers A and B is 20 μm or less, preferably 15 μm or less, more preferably 10 μm or less, and further preferably 5 μm or less. The thickness of the diffusion preventing layers A and B is preferably 0.05 μm or more. The thickness of the diffusion preventing layers A and B is preferably within the above mentioned range, more preferably within 0.05 μm to 5 μm, further preferably 0.05 μm to 3 μm, and further more preferably 0.5 μm to 3 μm. Particularly, when the polarizing plate has the adhesive layer on a side opposite to the polarizing film, of the diffusion preventing layer A or B, the thickness thereof is preferably 0.5 μm to 20 μm, more preferably 0.5 μm to 3 μm. In this case, by having the thickness of 0.5 μm or more, transfer of the dichroic coloring matter to the adhesive layer can be sufficiently suppressed. When the polarizing plate has no adhesive layer on a side opposite to the polarizing film, of the diffusion preventing layer A or B, the thickness thereof is preferably 0.5 μm to 3 μm. In this case, by having the thickness of 0.5 μm or more, transfer of the dichroic coloring matter to the adhesive layer can be sufficiently suppressed.

The thickness of the diffusion preventing layer A and the thickness of the diffusion preventing layer B may be the same or different.

In addition, the diffusion preventing layers A and B may be a monolayer, or may be composed of a plurality of layers, respectively.

The diffusion preventing layers A and B may have a surface treated layer on a surface opposite to the polarizing film thereof. Examples of the surface treated layer include, for example, an optical layer such as a hard coat layer, an antireflection layer, a sticking preventing layer, an antiglare layer and a diffusion layer.

The hard coat layer is aimed at preventing a surface of the polarizing plate being flawed, etc., and can be formed, for example, by a method of adding a cured film excellent in hardness and sliding property due to an ultraviolet curable resin such as an acrylic-based ultraviolet curable resin, and a silicone-based ultraviolet curable resin to a surface of the diffusion preventing layer. The antireflection layer is aimed at preventing light from outside being reflected on a surface of the polarizing plate, and the prevention can be attained by forming the conventional antireflection film or the like. Additionally, the sticking preventing layer is aimed at preventing adherence between a layer with which this layer is contacted.

Additionally, the antiglare layer is aimed at, for example, preventing light from outside from being reflecting on a surface of the polarizing plate and inhibiting visual recognition of light transmitted through the polarizing plate, and can be formed, for example, by imparting a fine irregular structure to a surface of the diffusion preventing layer, by a method such as a roughening method by way of a sand-blasting method or an embossing method, or a method of incorporating transparent fine particles. Examples of the fine particles to be contained for forming the surface fine irregular structure include, for example, transparent fine particles such as inorganic fine particles which can have electrical conductivity, consisting of silica, alumina, titania, zirconia, tin oxide, indium oxide, cadmium oxide, antimony oxide or the like, having an average particle diameter of 0.5 to 50 μm, and organic fine particles consisting of a crosslinked or uncrosslinked polymer. When the surface fine irregular structure is formed, the content of the fine particles is usually 2 to 50 parts by mass, and preferably 5 to 25 parts by mass, based on 100 parts by mass of a transparent resin which forms the surface fine irregular structure. The antiglare layer may also serve as a diffusion layer for diffusing light transmitted through the polarizing plate to extend a visual angle (visual extension function), etc.

In addition, the antireflection layer, the sticking preventing layer, the diffusion layer and the antiglare layer can be incorporated by providing them on the diffusion preventing layer itself, or may be provided separately from the diffusion preventing layer, as a separate optical layer.

The diffusion preventing layers A and B are usually obtained by coating a solution of materials constituting respective diffusion preventing layers (hereinafter, also referred to as "diffusion preventing layer composition") on an appropriate member such as a substrate, an oriented film, a polarizing film, and a front plate, followed by curing. When the diffusion preventing layer composition is a composition in which materials constituting the diffusion preventing layer are dissolved in a solvent, materials constituting the diffusion preventing layer may be cured by removing the solvent, and after removal of the solvent, the materials may be cured via a further chemical reaction.

The diffusion preventing layer composition may be coated on the member, and cured, or after coating on the member, another member may be laminated thereon to cure the composition.

The solvent is enough as long as it is a solvent which dissolves materials constituting the diffusion preventing layer, and examples thereof include, for example, the solvents exemplified as the solvent of the orientable polymer composition.

The concentration of the materials constituting the diffusion preventing layer in the diffusion preventing layer composition is preferably 0.1 to 20% by mass, and more preferably 0.1 to 10% by mass, in solid content equivalent.

Examples of a method of coating the diffusion preventing layer composition on the substrate, and a method of removing (drying) the solvent include the same methods as those described in the orientable polymer composition.

<Adhesive Layer>

The polarizing plate of the present invention may have an adhesive layer on a side opposite to the polarizing film, of the diffusion preventing layer. The adhesive layer is formed of an adhesive. By the adhesive layer, the polarizing plate becomes to have good adhesiveness to the adherend, and the polarizing function derived from the polarizing film can be easily imparted to a desired region.

The adhesive may usually contain a polymer, and further a solvent. Examples of the polymer include, for example, an acrylic-based polymer, a silicone-based polymer, a polyester, a polyurethane, and a polyether. Among them, an acrylic-based adhesive containing an acrylic-based polymer is excellent in optical transparency, has moderate wettability and cohesive force, is excellent in adhesiveness, further, has high weather resistance and heat resistance, and hardly causes lifting and peeling under the condition of heating and humidification.

As the acrylic-based polymer, a copolymer of (meth) acrylate in which an alkyl group at an ester portion is an alkyl group of 20 or less carbon atoms such as a methyl group, an ethyl group or a butyl group (hereinafter, acrylate and methacrylate are collectively referred to as (meth) acrylate, and acrylic acid and methacrylic acid are collectively referred as (meth) acrylic acid, in some cases), and a (meth) acrylic-based monomer having a functional group such as (meth) acrylic acid and hydroxyethyl (meth) acrylate is preferable.

The adhesive containing such a copolymer is excellent in tackiness, and after sticking to a display device, and upon removal, it can be relatively easily removed without generating the adhesive residue or the like in a display device. A glass transition temperature of the acrylic-based polymer is preferably 25° C. or lower, and more preferably 0° C. or lower. A weight average molecular weight of such an acrylic-based polymer is preferably 100000 or more.

Examples of the solvent include, for example, the solvents exemplified as the solvent of the orientable polymer composition.

Additionally, the adhesive may contain a light diffusing agent. The light diffusing agent is intended for imparting light diffusivity to the adhesive, it is enough as long as the light diffusing agent is fine particles having a different refractive index from that of the polymer contained in the adhesive, and examples of the light diffusing agent include fine particles consisting of an inorganic compound, and fine particles consisting of an organic compound (polymer). Since many polymers which are contained by the adhesive as an active component, including the acrylic-based polymer, have a refractive index of around 1.4, the light diffusing agent may be appropriately selected from those having a refractive index of around 1 to 2. A difference in a refractive index between the polymer which is contained by the adhesive as an active component, and the light diffusing agent is usually 0.01 or more, and from a viewpoint of brightness and display property of a display device, the difference is suitably 0.01 or more and 0.5 or less. As fine particles used as the light diffusing agent, fine particles having a spherical shape, and having dispersibility close to monodispersibility is preferable, and for example, fine particles having an average particle diameter in the range of around 2 to 6 μm are suitably used.

A refractive index is measured by a general minimum deviation method or an Abbe refractometer.

Examples of the fine particles consisting of an inorganic compound include aluminum oxide (refractive index 1.76) and silicon oxide (refractive index 1.45).

Examples of the fine particles consisting of an organic compound (polymer) include, for example, melamine beads (refractive index 1.57), polymethyl methacrylate beads (refractive index 1.49), methyl methacrylate/styrene copolymer resin beads (refractive index 1.50 to 1.59), polycarbonate beads (refractive index 1.55), polyethylene beads (refractive index 1.53), polystyrene beads (refractive index 1.6), polyvinyl chloride beads (refractive index 1.46), and silicone resin beads (refractive index 1.46).

The blending amount of the light diffusing agent is appropriately determined, in view of a haze value necessary for the adhesive layer formed of the adhesive, and brightness of a display device to which it is applied, and it is usually 3 to 30 parts by mass based on the content of 100 parts by mass of the polymer.

It is preferable that a haze value of the adhesive layer formed of the adhesive in which the light diffusing agent is dispersed is in the range of 20 to 80%, from a viewpoint that brightness of a display device to which the polarizing plate of the present invention is applied is maintained, and at the same time, bleeding or blurring of a display image is hardly caused. A haze value is a value represented by (diffusion transmittance/total light transmittance)×100(%), and is measured in accordance with JIS K 7105.

The thickness of the adhesive layer formed of the adhesive is determined depending on an adhesive force thereof and the like, and is not particularly limited, but is usually 1 to 40 μm. From a viewpoint of processability and durability, the thickness is preferably 5 to 25 μm, and more preferably 5 to 15 μm. By adopting the thickness of the adhesive layer formed of the adhesive of around 5 to 15 μm, the adherend and the polarizing film can be sufficiently adhered, and reduction in the thickness of the whole display can be attained.

<Front Plate>

The polarizing plate of the present invention may comprise a front plate arranged on a side opposite to the polarizing film, of the diffusion preventing layer, and when the polarizing plate of the present invention comprises the adhesive layer, the polarizing plate of the present invention may comprise a front plate arranged on a side opposite to the diffusion preventing layer, of the adhesive layer.

The front plate is responsible fora role in suppressing warpage of an image display element such as a liquid crystal cell, and protecting an image display element, and is, for example, a translucent (preferably, optically transparent) plate-like body. The front plate may be of a monolayer structure, or of a multilayer structure.

Since the front plate is arranged on an outermost side in a final product comprising the polarizing plate of the present invention, it is required to also exhibit sufficient durability when used outdoor or half-outdoor. From such a viewpoint, it is preferable that the front plate is composed of an inorganic material such as a glass and a tempered glass, or a polymer film having Young's modulus of 2 GPa or more. The inorganic material such as a glass and a tempered glass, particularly, a polymer film for intended use of a flexible display is preferable, and among them, it is particularly preferable that the front plate is composed of a polycarbonate resin (Young's modulus 2 to 3 GPa), an acrylic resin (Young's modulus 3 to 4 GPa), a polyimide resin (Young's modulus 3 to 5 GPa), or a polyether sulfone resin (Young's modulus 2 to 3 GPa).

The front plate may have a color filter layer or a TFT layer in a display, a transparent electrode layer of a touch panel, or a glass or a polymer film on which a decorating layer is printed. That is, in one embodiment of the present invention, the front plate may have one or more patterning layers selected from the group consisting of the following (A) to (D), on at least one side thereof.

(A) Color filter layer
(B) TFT layer
(C) Transparent electrode layer
(D) Decorating layer A system of the touch panel is not particularly limited, but examples thereof include an electrostatic capacity system, a surface acoustic wave system, a resistant film system, an electromagnetic induction system, a photosensor system, an infrared system and the like. The front plate may have the function such as antireflection, antifouling, electromagnetic wave shielding, near infrared shielding, color tone adjustment, and glass scattering prevention. As the front plate having such function, a front plate in which at least one film layer having these functions is laminated on at least one side of the front plate may be used.

Integration of the front plate and the polarizing plate can be realized by sticking them, if necessary, via the adhesive layer. When the polarizing plate of the present invention comprises the adhesive layer, in order to exclude reflection at an interface between the front plate and the polarizing plate, and scattering of light, and improve visibility, it is preferable that a refractive index of the adhesive is close to or the same as a refractive index of the front plate, and it is preferable that they are optically transparent. When the front plate and the polarizing plate are directly adhered with the diffusion preventing layer without using the adhesive, double reflection can be prevented, and this is also preferable from a viewpoint of reduction in the thickness of the whole display.

The polarizing plate with a front plate of the present invention can suppress warpage of an image display element such as a liquid crystal cell, and can prevent an image display element from being flawed. Furthermore, the polarizing plate with a front plate of the present invention is also more preferable in that it can be continuously produced by Roll to Roll, in the case where the front plate is in the flexible form (polymer film).

<Phase Difference Film>

The polarizing plate of the present invention may be equipped with a phase difference film on a side opposite to the polarizing film of the diffusion preventing layer. Additionally, when the polarizing plate of the present invention is equipped with the adhesive layer, the polarizing plate of the present invention may be equipped with the phase difference film on a side opposite to the diffusion preventing layer of the adhesive layer. Furthermore, the polarizing plate of the present invention may be equipped with both of the front plate and the phase difference film, and in the polarizing plate with a front plate, it may be equipped with the phase difference film on a side opposite to the polarizing film of the diffusion preventing layer.

It is preferable that the phase difference film is a phase difference film in which the birefringence $\Delta n$ ($\lambda$) relative to light having the wavelength $\lambda$ nm exhibits phase difference property represented by the following expressions (1-1) and (2-1) and the following expression (3).

$$\Delta n(450)/\Delta n(550) \leq 1.00 \tag{1-1}$$

$$1.00 \leq \Delta n(650)/\Delta n(550) \tag{2-1}$$

$$120 \leq Re(550) \leq 180 \tag{3}$$

$\Delta n(450)$, $\Delta n(550)$, and $\Delta n(650)$ represent the birefringence at the wavelength of 450 nm, 550 nm, and 650 nm, respectively.

The birefringence $\Delta n$ ($\lambda$) is obtained by measuring in-plane retardation, and dividing this value by the thickness of the phase difference film. A specific measuring method is shown in Examples, and thereupon, by measuring a film made on such a substrate that there is no retardation in a substrate itself, as in a glass substrate; substantial property of the phase difference film can be measured. That is, the phase difference film is preferably a phase difference film exhibiting phase difference property represented by the following expressions (1) and (2) and the above expression (3).

$$Re(450)/Re(550) \leq 1.00 \tag{1}$$

$$1.00 \leq Re(650)/Re(550) \tag{2}$$

Re(450), Re(550) and Re(650) represent in-plane retardation at the wavelength of 450 nm, 550 nm and 650 nm, respectively.

The thickness of the phase difference film is not particularly limited, but is generally 100 µm or less, and from a viewpoint of reduction in the thickness of a display, the thickness is preferably 0.5 µm to 20 µm, and more preferably 1 µm to 3 µm. Examples of the very thin phase difference film having the thickness of 1 µm to 3 µm include a polymer obtained by curing the polymerizable liquid crystal in the state where it is oriented.

<Method of Producing Polarizing Plate>

A dried film of a composition for forming a polarizing film is formed on a substrate surface, by forming a diffusion preventing layer on the substrate surface, further coating the composition for forming a polarizing film on a surface of the formed diffusion preventing layer, and thereafter, removing a solvent contained in the composition for forming a polarizing film at the condition under which the polymerizable liquid crystal is not polymerized. Examples of a method of removing the solvent include, for example, a natural drying method, a forced-air drying method, a heated-air drying method and a reduced pressure drying method.

The polymerizable liquid crystal is polymerized by liquid crystal-orienting the polymerizable liquid crystal contained in the dried film, particularly, orienting it in the state of a smectic phase by heating the dried film, etc., and thereafter, irradiating the dried film with the energy while this liquid crystal orientation is retained. When the composition for forming a polarizing film contains a polymerization initiator, it is preferable to irradiate the energy at the condition under which the polymerization initiator is activated. When the polymerization initiator is a photopolymerization initiator, it is preferable that the energy is light. Light to be irradiated is appropriately selected depending on a kind of the polymerization initiator contained in the dried film, or a kind (particularly, a kind of a polymerizable group possessed by the polymerizable liquid crystal) and an amount of the polymerizable liquid crystal. Examples of such light include light selected from the group consisting of visible light, ultraviolet light and laser light, and an active electron beam, and among them, from a viewpoint of easy control of progression of a polymerization reaction, and from a viewpoint that as a device related to polymerization, a device which is widely used in the art can be used, ultraviolet light is preferable. Accordingly, it is preferable that kinds of the polymerizable liquid crystal and the polymerization initiator contained in the composition for forming a polarizing film are selected in advance, so that polymerization can be performed with ultraviolet light. In addition, upon polymerization, it is preferable to control a polymerization temperature by irradiation of ultraviolet light, together with cooling the dried film with an appropriate cooling means. By such cooling, when the polymerizable liquid crystal is polymerized at a lower temperature, even if the diffusion preventing layer having low heat resistance is used, the polarizing film can be appropriately produced. Thereafter, by forming the diffusion preventing layer on the polarizing film, the polarizing plate of the present invention can be produced. In addition, before coating of the composition for forming a polarizing film on a surface of the diffusion preventing layer, an oriented film may be formed on a surface of the diffusion preventing layer, if necessary, and the polarizing film may be formed on the oriented film.

By using the polarizing plate of the present invention, the polarizing plate with a front plate can also be produced. It is preferable that the polarizing plate with a front plate is produced, by a method comprising a step of coating the adhesive on a surface of the diffusion preventing layer of the polarizing plate of the present invention, and sticking the polarizing plate of the present invention on the front plate via the adhesive. By this method, it is possible to impart a uniform polarizing plate without being greatly influenced by the state of a region to be stuck, for example, the state of a level difference or an irregular structure. In addition, when the diffusion preventing layer is a material exhibiting adhesiveness to the adherend, since it is not necessary to coat the adhesive on a surface of the diffusion preventing layer, this is industrially advantageous, and reduction in the thickness of the polarizing plate with a front plate becomes easy.

By using the polarizing plate of the present invention, an elliptic polarizing plate can also be produced. It is preferable that the elliptic polarizing plate is produced by a method comprising a step of coating the adhesive on a surface of the diffusion preventing layer of the polarizing plate of the present invention, and sticking the polarizing plate of the present invention on the phase difference film via this adhesive. By this method, a uniform elliptic polarizing plate can be produced without being greatly influenced by the state of a region to be stuck, for example, the state of a level difference or an irregular structure. In addition, when the diffusion preventing layer is a material exhibiting adhesiveness to the adherend, since it is not necessary to coat the adhesive on a surface of the diffusion preventing layer, this is industrially advantageous, and reduction in the thickness of the elliptic polarizing plate becomes easy.

Examples of the substrate to be used for forming the polarizing film include a glass substrate and a plastic substrate, preferably a plastic substrate. A plastic substrate is more preferable than a glass substrate in that Roll-to-Roll processing is possible, and productivity is high. Examples of a plastic constituting the plastic substrate include, for example, plastics such as polyolefins such as polyethylene, polypropylene, and a norbornene-based polymer; cyclic olefin-based resins; polyvinylalcohol; polyethyleneterephthalate; polymethackylic acid ester; polyacrylic acid ester; cellulose esters such as triacetylcellulose, diacetylcellulose and cellulose acetate propionate; polyethylene naphthalate; polycarbonate; polysulfone; polyether sulfone; polyether ketone; polyphenylene and polyphenylene oxide; and the like.

Examples of a commercially available cellulose ester substrate include "Fujitack Film" (produced by Fujifilm Co., Ltd.); "KC8UX2M", "KC8UY" and "KC4UY" (all produced by Konica Minolta Opto Co., Ltd.), and the like.

Examples of a commercially available cyclic olefin-based resin include "Topas" (registered trademark) (produced by Ticona Co., Ltd.), "ARTON" (registered trademark) (produced by JSR Corporation), "ZEONOR" (registered trademark), "ZEONEX" (registered trademark) (all produced by ZEON CORPORATION) and "APEL" (registered trademark) (produced by Mitsui Chemicals, Inc.). By making a film of such a cyclic olefin-based resin by the known means such as a solvent casting method and a melt extrusion method, the substrata can be formed. A commercially available cyclic olefin-based resin substrate can also be used. Examples of the commercially available cyclic olefin-based resin substrate include "Escena" (registered trademark), "SCA40" (registered trademark) (all produced by Sekisui Chemical Co., Ltd.), "ZEONOR FILM" (registered trademark) (produced by Optes Co., Ltd.) and "ARTON FILM" (registered trademark) (produced by JSR Corporation).

The thickness of the substrate is preferably thinner in that amass of the substrate is such a mass that practical handling is possible, but when the substrate is too thin, the strength is reduced, and processability tends to be inferior. The thickness of the substrate is usually 5 µm to 300 µm, and preferably 20 µm to 200 µm.

By forming the polarizing plate of the present invention on the substrate, sticking the polarizing film to the adherend such as the front plate and the phase difference film, if necessary, via the adhesive layer, and removing the relevant substrate, the polarizing plate of the present invention can be transferred to the adherend.

Examples of a process for producing the polarizing plate of the present invention include, for example, the following processes of (A) to (C). In addition, the diffusion preventing layer A and the diffusion preventing layer B can be exchanged in any process.

<Process (A)>

A process comprising the following steps of 1 to 3:

1. a step of forming a diffusion preventing layer A on a substrate;

2. a step of forming a polarizing film on the diffusion preventing layer A; and 3. a step of forming a diffusion preventing layer B on the polarizing film.

The process (A) may further comprise the following steps:

4. a step of sticking the diffusion preventing layer B and an adherend; and 5. a step of removing the substrate.

In addition, in the process (A), an oriented film may be formed between the diffusion preventing layer A and the polarizing film, or the diffusion preventing layer A may be subjected to the orientation treatment to obtain an oriented film. That is, the oriented film is formed on the diffusion preventing layer A, and the polarizing film may be formed thereon.

Additionally, sticking between the diffusion preventing layer B and the adherend may be direct sticking, or the adhesive is coated on the diffusion preventing layer B, and the diffusion preventing layer B and the adherend may be stuck via it. In the case of direct sticking, a diffusion preventing layer composition for forming the diffusion preventing layer B is coated on the polarizing film, the adherend is laminated thereon, and the diffusion preventing layer composition may be cured. According to such a process, the polarizing plate of the present invention can be effectively produced.

<Process (B)>

A process comprising the following steps of 1 to 5:

1. a step of forming a diffusion preventing layer A on a substrate;

2. a step of forming a polarizing film on the diffusion preventing layer A;

3. a step of coating a diffusion preventing layer composition for forming a diffusion preventing layer B on the polarizing film or an adherend;

4. a step of sticking the polarizing film and an adherend via the diffusion preventing layer composition;

5. a step of forming the diffusion preventing layer B by curing the diffusion preventing layer composition.

The process (B) may further comprise the following step:
6. a step of removing the substrate.

In addition, in the process (B), an oriented film may be formed between the diffusion preventing layer A and the polarizing film. That is, the oriented film is formed on the diffusion preventing layer A, and the polarizing film may be formed thereon. According to such a process, since the polarizing plate of the present invention can be directly formed on the adherend, reduction in the thickness of a display becomes easy, and a uniform polarizing plate can be imparted to the various display devices without being greatly influenced by the state of a region to be stuck with the polarizing plate, for example, the state of a level difference or an irregular structure.

<Process (C)>

A process comprising the following steps of 1 to 8:
1. a step of forming a polarizing film on a substrate;
2. a step of coating a diffusion preventing layer composition (1) for forming a diffusion preventing layer B on the polarizing film or an adherend (1);
3. a step of sticking the polarizing film and the adherend (1) via the diffusion preventing layer composition (1);
4. a step of forming the diffusion preventing layer B by curing the diffusion preventing layer composition (1);
5. a step of removing the substrate;
6. a step of coating a diffusion preventing layer composition (2) for forming a diffusion preventing layer A on a surface of the polarizing film, from which the substrate has been removed, or on an adherend (2);
7. a step of sticking the surface of the polarizing film, from which the substrate has been removed, and the adherend (2) via the diffusion preventing layer composition (2); and
8. a step of forming a diffusion preventing layer A by curing the diffusion preventing layer composition.

In addition, in the process (C), an oriented film may be formed between the substrate and the polarizing film. That is, the oriented film is formed on the substrate, and the polarizing film may be formed thereon. According to such a process, since the polarizing plate can be directly formed between two adherends, to adhere these adherends, reduction in the thickness of a display becomes easy, and a uniform polarizing plate can be imparted to the various display devices without being greatly influenced by the state of a region to be stuck with the polarizing plate, for example, the state of a level difference or an irregular structure.

The polarizing plate, the polarizing plate with a front plate and the elliptic polarizing plate of the present invention can be used in a variety of display devices. The display device is a device having a display element, and comprises a light emitting element or a light emitting device as a light emitting source. Examples of the display device include a liquid crystal display device, an organic electroluminescence (EL) display device, an inorganic electroluminescence (EL) display device, a touch panel display device, an electron emission display device (e.g. field emission display device (FED), a surface field emission display device (SED)), an electron paper (a display device using an electronic ink or an electrophoresis element, a plasma display device, a projection-type display device (e.g. grating light valve (GLV) display device, a display device having a digital micromirror device (DMD)) and a piezoelectric ceramic display and the like. The liquid crystal display device includes any of a transmission liquid crystal display device, a translucent liquid crystal display device, a reflection liquid crystal display device, a direct vision liquid crystal display device and a projection liquid crystal display device. These display devices may be a display device displaying a two-dimensional image, or a stereoscopic display device displaying a three-dimensional image. Particularly, the polarizing plate, the polarizing plate with a front plate and the elliptic polarizing plate of the present invention can be effectively used in a liquid crystal display device, and an organic electroluminescence (EL) display device.

When the polarizing plate of the present invention is used by transferring it to the various display devices, a uniform polarizing plate can be imparted to the various display devices without being greatly influenced by the state of a region to be transferred, for example, the state of a level difference or an irregular structure.

EXAMPLES

The Present invention will be further illustrated in detail below, by way of Examples and Comparative Examples.

[Preparation of Composition for Forming Polarizing Film]

The following components were mixed, and stirred at 80° C. for 1 hour to obtain a composition for forming a polarizing film. As a dichroic coloring matter, an azo coloring matter described in Examples of JP-A-2013-101328 was used.

Polymerizable liquid crystal:

[Chemical formula 14]

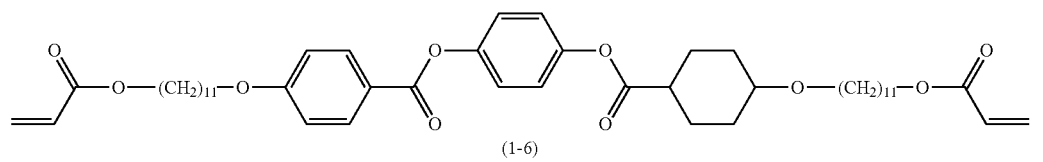

75 parts (1-6)

[Chemical formula 15]

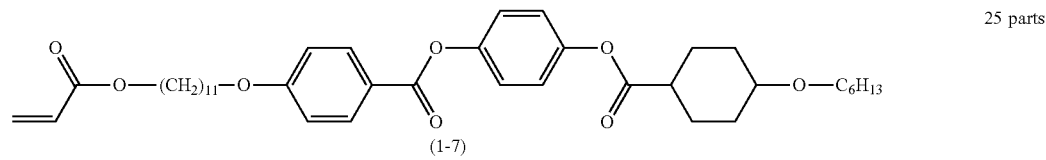

25 parts (1-7)

Dichroic coloring matter 1: Azo coloring matter;

[Chemical formula 16]

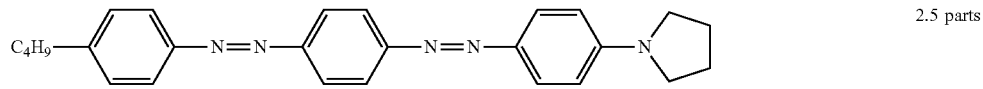

2.5 parts

[Chemical formula 17]

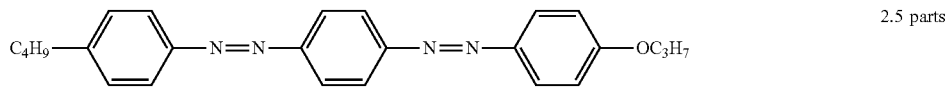

2.5 parts

[Chemical formula 18]

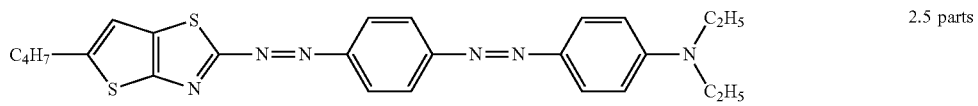

2.5 parts

| Polymerization initiator: | |
| --- | --- |
| 2-Dimethylamino-2-benzyl-1-(4-morpholinophenyl)butane-1-one (Irgacure 369; produced by Ciba Specialty Chemicals Co., Ltd.) | 6 parts |
| Leveling agent: | |
| Polyacrylate compound (BYK-361N; produced by BYK-Chemie) | 1.2 parts |
| Solvent: | |
| o-Xylene | 250 parts |

[Preparation of Composition for Forming Photo-Oriented Film]

The following components described in JP-A-2013-033299 were mixed, and the resulting mixture was stirred at 80° C. for 1 hour to obtain a composition for forming a photo-oriented film.

| Photo-orientable polymer | |
| --- | --- |
| [Chemical formula 19] 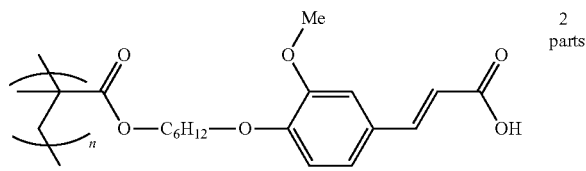 | 2 parts |
| Solvent: | |
| o-Xylene | 98 parts |

[Preparation of Water-Soluble Polymer (1)]

A water-soluble polymer (1) has the following structural unit which is synthesized according to the following synthesis scheme.

[Chemical formula 20]

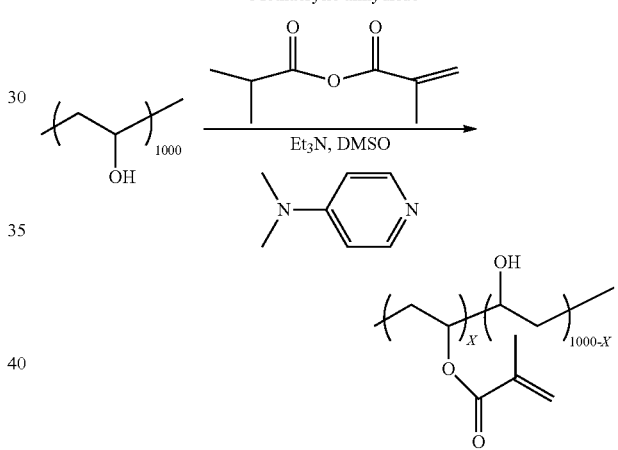

$Ds = X/1000$

Water-soluble polymer

In 400 g of dimethyl sulfoxide were dissolved 20 g of polyvinyl alcohol having a molecular weight of 1000 (produced by Wako Pure Chemical Industries, Ltd.), 0.55 mg of N,N-dimethyl-4-aminopyridine as a nucleophilic agent, and 4.6 g of triethylamine, and a temperature was raised to 60° C. while stirring. Thereafter, a solution obtained by dissolving 10.5 g of methacrylic anhydride in 50 g of dimethyl sulfoxide was added dropwise over 1 hour, and the mixture was heated to stir at 60° C. for 14 hours to react them. After the resulting reaction solution was cooled to room temperature, 481 g of methanol was added to the reaction solution, and the materials were stirred so that they were completely mixed, thereby, the ratio of the reaction solution and methanol was adjusted at 1:1. To this solution was added gradually 1500 mL of acetone, thereby, a water-soluble polymer (1) was crystallized by a crystallizing method. A solution containing the resulting white crystal was filtered, washed well with acetone, and vacuum-dried to obtain 20.2 g of a water-soluble polymer (1).

[Preparation of Colored Photosensitive Resin Composition]

The following components [a] to [e] were mixed, and stirred for 1 hour to obtain a colored photosensitive resin composition.

| | |
|---|---|
| [a] Copolymer of benzyl methacrylate and methacrylic acid [The content of a benzyl methacrylate unit is 65% as expressed by the molar fraction, the content of a methacrylic acid unit is 35% as expressed by the molar fraction, and a weight average molecular weight is 9,700] | 21 parts by mass |
| [b] Addition polymerizable compound having ethylenic unsaturated bond [dipentaerythritol hexaacrylate] | 22 parts by mass |
| [c] Photopolymerization initiator [2,4-Bis(trichloromethyl)-6-piperonyl-1,3,5-triazine] | 5.0 parts by mass |
| [d] Solvent [propylene glycol monomethyl ether acetate] | 374 parts by mass |
| [e] Pigment [mixture of 40 parts by mass of black pigment (C.I. Pigment Black 7) and 12 parts by mass of dispersant] | 52 parts by mass |

[Preparation of Front Plate (Glass) with Decorating Layer]

Using a tempered glass having a size of 120 mm×70 mm and the thickness of 0.55 mm [product name "Gorilla" produced by Corning Incorporated] as a transparent front plate, this was subjected to ultrasound washing treatment for 2 minutes in the state where it was immersed in an isopropanol solution. Then, the glass was washed with ion-exchanged water, further subjected to ultrasound washing treatment for 2 minutes, and dried at 100° C. for 3 minutes. Thereafter, the glass was immersed in a 0.5 mass % aqueous solution of a silane coupling agent (product name: KBM-403 produced by Shin-Etsu Chemical Co., Ltd.) for 3 minutes, and dried at 100° C. for 3 minutes to form a primer layer. The colored photosensitive resin composition was coated on the primer layer by a spin coating method, and dried at 100° C. for 3 minutes to form a colored photosensitive resin composition layer on a substrate. The thickness of this colored photosensitive resin composition layer after drying was 1.2 μm. The substrate on which the colored photosensitive resin composition layer had been formed was irradiated with ultraviolet light at intensity of 400 mJ/cm$^2$ via a photomask having a shape shown in FIG. 3 using a high pressure mercury lamp, and the colored photosensitive resin composition layer after exposure was immersed in a developer [aqueous solution containing potassium hydroxide at 0.01% by mass as expressed by the mass fraction, and containing a nonionic surfactant] to perform development. After development, the laminate was washed with water, and heated at 230° C. for 20 minutes to form a black pattern (decorating layer) having the thickness of 1.2 μm on a front plate. A level difference of 1.2 μm is generated between a portion on which the decorating layer is formed and a portion on which the decorating layer is not formed.

[Preparation of Front Plate (Film) with Decorating Layer]

Using a PMMA film having a size of 120 mm×70 mm [product name: Technolloy (registered trademark) film, produced by Sumitomo Chemical Co., Ltd., 100 μm] as a transparent front plate (film), after corona treatment, a 0.5 mass % aqueous solution of a silane coupling agent (product name: KBM-403, produced by Shin-Etsu Chemical Co., Ltd.) was coated with a slot die coater, and the film was dried at 100° C. for 2 minutes to form a primer layer. The colored photosensitive resin composition was coated on the primer layer with a slot die coater, and dried at 100° C. for 3 minutes to form a colored photosensitive resin composition layer on a substrate. The thickness of this colored photosensitive resin composition layer after drying was 1:2 μm.

Figure 3:
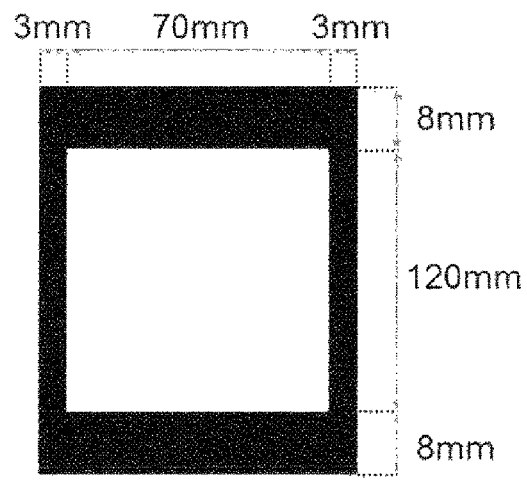
FIG. 3 represents a shape of a photomask used in Examples.

The substrate on which the colored photosensitive resin composition layer had been formed, was irradiated with ultraviolet light at intensity of 400 mJ/cm$^2$ via a photomask having a shape shown in FIG. 3 using a high pressure mercury lamp, and the colored photosensitive resin composition layer after exposure was immersed in a developer [aqueous solution containing potassium hydroxide at 0.01% by mass as expressed by the mass fraction, and containing a nonionic surfactant] to perform development. After development, the substrate was washed with water, and heated at 200° C. for 20 minutes to form a black pattern (decorating layer) having the thickness of 1.2 μm on a front plate. A 1.2 μm level difference is generated between a portion on which the decorating layer is formed and a portion on which the decorating layer is not formed.

[Preparation of Composition for Forming Phase Difference Film]

The following components were mixed, and stirred at 80° C. for 1 hour to obtain a composition for forming a phase difference film.

| | |
|---|---|
| Polymerizable liquid crystal: compound (A11-1) | 100 parts |

[Chemical formula 21]

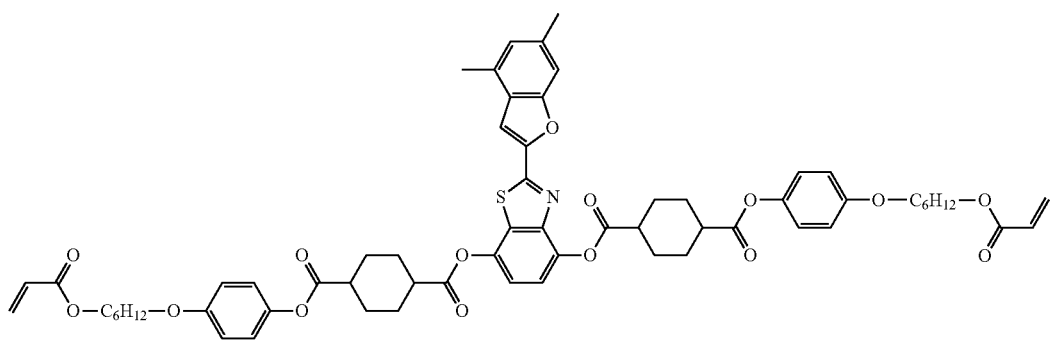

A11-1

| | |
|---|---:|
| Polymerizable liquid crystal; compound (x-1) [Chemical formula 22] | 33 parts |

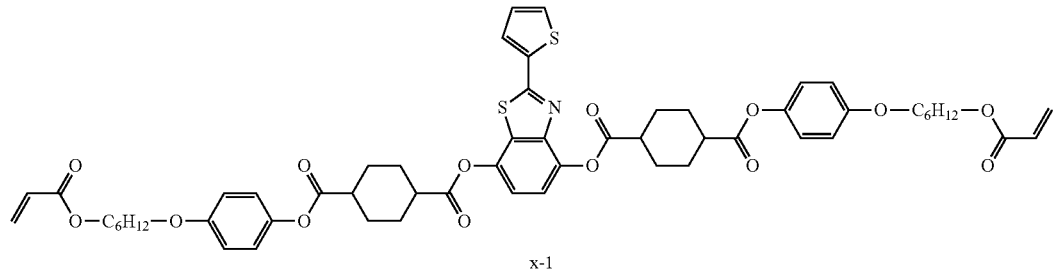

x-1

| | |
|---|---:|
| Polymerization initiator; 2-Dimethylamino-2-benzyl-1-(4-morpholinophenyl)butane-1-one (Irgacure (registered trademark) 369; produced by BASF Japan) | 8 parts |
| Leveling agent; Polyacrylate compound (BYK-361N; produced by BYK-Chemie) | 0.1 part |
| Other additive; LALOMER LR9000 (produced by BASF Japan) | 6.7 parts |
| Solvent; Cyclopentanone | 546 parts |
| Solvent; N-methylpyrrolidone | 364 parts |

Example 1

A 3 mass % aqueous solution of the water-soluble polymer (1) was continuously coated on a release-treated surface of a roll-like release polyethylene terephthalate (PET) film ("FF-50" produced by UNITIKA LTD., one side release-treated PET film, thickness of substrate: 50 μm) having the film width of 800 nm as a substrate with a slot die coater, and dried at 100° C. for 2 minutes to obtain a transparent resin layer A (diffusion preventing layer A) consisting of a 1 μm film of a water-soluble polymer (1).

After a surface of this film of the water-soluble polymer (1) was subjected to plasma treatment, the composition for forming a photo-oriented film was coated using a slot die coater to form a first coating film on a center of the film in the range of the width 600 mm. Further, the film was conveyed in a forced-air drying furnace set at 100° C. over 2 minutes to remove the solvent, to form a first dried film. Thereafter, the first dried film was irradiated with polarized UV light in a 45° direction relative to a longitudinal direction of the film at intensity of 20 mJ/cm$^2$ (313 nm standard) to impart an orientation regulating force, to form a photo-oriented film.

The composition for forming a polarizing film was further coated on the resulting photo-oriented film using a slot die coater to form a second coated film on a center of the film in the range of the width 600 mm. Further, the laminate was conveyed in a forced-air drying furnace set at 110° C. over 2 minutes to remove the solvent, to form a second dried film. Thereafter, ultraviolet light was irradiated at 1000 mJ/cm$^2$ (365 nm standard) using a high pressure mercury lamp to cure a polymerizable liquid crystal contained in the second dried film, to form a polarizing film.

Thereafter, the polarizing film was continuously wound up roll-like to obtain a 100 m continuous polarizing film having an absorption axis in a 45° C. direction. Further, after plasma treatment was performed on the polarizing film, a 3 mass % aqueous solution of a water-soluble polymer (1) was continuously coated with a slot die coater, and dried at 100° C. for 2 minutes to form a transparent resin layer B (diffusion preventing layer B) consisting of a film of a 1 μm water-soluble polymer (1), to obtain a continuous polarizing plate roll (1).

A piece was excised from the resulting continuous polarizing plate roll (1) into a size of 5 centimeters square, and the substrate was slowly peeled to obtain a polarizing plate (1) which is a thin film having the thickness of 4 μm. When this polarizing plate (1) was subjected to cross-sectional observation with a scanning transmission electron microscope (STEM, field emission scanning electron microscope (FE-STEM), model number: "S-5500", produced by Hitachi, Ltd.), it was confirmed that a very thin polarizing plate having a structure of diffusion preventing layer A (1 μm)/polarizing film (2 μm)/diffusion preventing layer B (1 μm) is formed. In addition, the thickness of the photo-oriented film was about 50 nm.

[Measurement of Polarization Degree Py, Single Body Transmittance Ty]

As described above, a polarization degree Py and a single body transmittance Ty of the polarizing plate (1) were measured. A single body transmittance ($T^1$) in a transmission axis direction and a single body transmittance in an absorption axis direction ($T^2$) were measured in the wavelength range of a 2 nm step of 380 to 680 nm by a double beam method, using a device in which a holder with a polarizer is set in a spectrophotometer (UV-3150 produced by Shimadzu Corporation). Using the following expressions (p) and (q), a single body transmittance and a polarization degree at each wavelength were calculated, further, visibility correction was performed by 2 degree field (C light source) of JIS Z 8701, and a visibility correction single body transmittance (Ty) and a visibility correction polarization degree (Py) were calculated. A single body transmittance was 42%, and a polarization degree was 97%, and it was confirmed that they are values useful as the polarizing plate. Further, also when measurement was performed again after heating at 100° C. for 120 hours, there was no deterioration in performance, and similarly, a single body transmittance retained 42%, and a polarization degree retained 97%.

$$\text{Single body transmittance } Ty(\%)=(T^1+T^2)/2 \tag{p}$$

$$\text{Polarization degree } Py(\%)=\{(T^1-T^2)/(T^1+T^2)\}\times 100 \tag{q}$$

Example 2

After a surface opposite to a release treatment side of a roll-like release polyethylene terephthalate (PET) film having the film width of 800 mm ("FF-50" produced by UNITIKA LTD., one side release-treated PET film, the thickness of support substrate: 50 μm) was subjected to corona treatment, the composition for forming a photo-oriented film was coated with a slot die coater. The resulting coated film was dried at 120° C. for 2 minutes, and cooled to room temperature to form a first dried film. Thereafter, polarized ultraviolet light was irradiated at 100 mJ (313 nm standard) so that a direction of an orientation regulating force forms an angle of 0° relative to a conveyance direction (longitudinal direction) of the continuous film, to obtain a continuous photo-oriented film.

The composition for forming a phase difference film was coated on this photo-oriented film with a slot die coater to form a coated film. This coated film was heat-dried at 120° C. for 2 minutes, and cooled to room temperature, and a second dried film was irradiated with ultraviolet light at an exposure amount of 1000 mJ/cm$^2$ (365 nm standard) using an ultraviolet light irradiating device to form a phase difference film. Thereby, a continuous phase difference film (1) was obtained.

From the resulting phase difference film (1), a film piece (4 cm×4 cm) at an arbitrary place was excised, and the thickness of the photo-oriented film and the phase difference film was measured using a laser microscope (LEXT3000, produced by Olympus Corporation). As a result, the thickness of the photo-oriented film was 50 nm, and the thickness of the phase difference film was 2.1 μm, and it was confirmed that a very thin phase difference film was obtained.

[Measurement of Phase Difference Value]

From the resulting phase difference film (1), a film piece (4 cm×4 cm) at an arbitrary place was excised, and stuck to a glass via an adhesive (pressure-sensitive adhesive, produced by Lintec Corporation, the thickness 5 μm), and a PET film was slowly peeled to obtain a measurement sample. When a front phase difference value of this measurement sample at the wavelength of 450.9 nm, 549.4 nm, a 587.7 nm, 627.8 nm and 751.3 nm was measured using a birefringence measuring device (KOBRA-WPR, produced by Oji Scientific Instruments), the value was 127 nm, 146 nm, 148 nm, 149 nm and 150 nm, respectively. When a front phase difference value at the wavelength of 450 nm, 550 nm, and 650 nm was calculated by Sellmeier Fitting, the value was 133 nm, 143 nm, and 149 nm. Thereby, it was confirmed that the expressions (1) to (3) are satisfied.

$$Re(450)/Re(550)=0.87≤1 \quad (1)$$

$$Re(650)/Re(550)=1/04≤1 \quad (2)$$

A diffusion preventing layer B side of a polarizing plate sheet and a decorating layer side of a front plate (glass) with a decorating layer, which had been cut into a size of 140 mm×65 mm from the polarizing film obtained in Example, were stuck via a 5 μm adhesive (pressure-sensitive adhesive, produced by Lintec Corporation, the thickness 5 μm), and PET of the polarizing film was slowly peeled to transfer the polarizing film having the thickness of 4 μm to the front plate (glass) with a decorating layer. Further, a film piece which had been cut into a size of 140 mm×65 mm from the phase difference film (1) was stuck to a diffusion preventing layer A side via a 5 μm adhesive (pressure-sensitive adhesive, produced by Lintec Corporation, the thickness 5 μm), and PET of the phase difference film was slowly peeled to transfer the phase difference film having the thickness of 2 μm onto the polarizing film of the front plate (glass) with a decorating layer, to prepare an elliptic polarizing plate with a front plate (2). Concerning this elliptic polarizing plate with a front plate (2), polarizing performance (polarization degree Py, single body transmittance Ty) was measured by making polarized light enter from a front plate side, as in Example 1. Further, after heating at 100° C. for 120 hours, polarizing performance was measured again. The result thereof is shown in Table 1.

[Measurement of Reflectivity]

An aluminum foil was stuck to a phase difference film side of the resulting elliptic polarizing plate with a front plate (2) via a 5 μm adhesive (pressure-sensitive adhesive, produced by Lintec Corporation, the thickness 5 μm), and reflectivity was measured from a front plate side using a spectral colorimeter (CM3700A produced by Konica Minolta, Inc.). When light of a D65 light source was made to enter from an 8° direction, and a reflection Y value was measured, reflectivity was 5.5%. Even in view of that reflection at an interface, between a front plate surface and an air phase is 3.9%, it is possible to state that the plate has excellent antireflection property.

Example 3

According to the same manner as that of Example 1 except that the diffusion preventing layer B was not formed, a continuous polarizing plate roll (2) was prepared, and a piece having a size of 120 mm×70 mm was excised, while after a surface of a decorating layer side of the front plate (film) with a decorating layer was subjected to corona treatment, an aqueous solution (viscosity: 92 cP) obtained by adding 7 parts of a carboxyl group-modified polyvinyl alcohol ["Kuraray Poval KL318" produced by Kuraray Co., Ltd.] and 3.5 parts of a water-soluble polyamidoepoxy resin ["Sumirez Resin 650" (aqueous solution having the solid content concentration of 30% by mass) obtained from Sumika Chemtex Co., Ltd.] as a heat crosslinking agent to 100 parts of water was coated with a wire bar coater (#30). A polarizing film side of the piece was overlapped on this coated surface, and this was laminator-treated, and dried at 80° C. for 5 minutes to dry the aqueous solution to form a diffusion preventing layer B', thereby, both films were adhered. By slowly peeling a PET film from this laminate, a polarizing plate with a front plate (3) was produced.

When concerning this polarizing plate with a front plate (3), cross section observation was performed with a scanning transmission electron microscope (STEM, field emission scanning electron microscope (FE-STEM), model number: "S-5500", produced by Hitachi, Ltd.), it was confirmed that a very thin polarizing plate of diffusion preventing layer B' (3 μm)/polarizing film (2 μm)/diffusion preventing layer A (1 μm) from a front plate film side is formed. In this case, since the di f fusion preventing layer B' also has the function as an adhesion layer with the front plate, further reduction in the thickness can be attained. In this polarizing plate with a front plate (3), even when there was a level difference of the decorating layer, a uniform film could be formed.

Subsequently, the phase difference film was transferred to a diffusion preventing layer A side via a 5 μm adhesive (pressure-sensitive adhesive, produced by Lintec Corporation, the thickness 5 μm) as in Example 2, to prepare an elliptic polarizing plate with a front plate (4). Concerning this elliptic polarizing plate with a front plate (4), polarizing performance (polarization degree Py, single body transmittance Ty) and reflectivity were measured by making polarized light enter from a front plate side, as in Examples 1 and 2. Further, after heating at 100° C. for 120 hours, polarizing performance was measured again. The result thereof is shown in Table 1.

Example 4

According to the same manner as that of Example 1 except that the diffusion preventing layer A and the diffusion preventing layer B were not formed, a continuous polarizing plate roll (3) was prepared, and a piece having a size of 120 mm×70 mm was excised. Further, as in Example 3, after a surface of a decorating layer side of the front plate (film) with a decorating layer was subjected to corona treatment, an aqueous solution (viscosity: 92 cP) obtained by adding 7 parts of carboxyl group-modified polyvinyl alcohol ["Kuraray Poval KL318" obtained from Kuraray Co., Ltd.], and 3.5 parts of a water-soluble polyamidoepoxy resin ["Sumirez Resin 650" (aqueous solution having the solid content concentration of 30% by mass) obtained from Sumika Chemtex Co., Ltd.] as a heat crosslinking agent to 100 parts of water was coated with a wire bar coater (#30). A polarizing film side of the piece was overlapped on this coated surface, laminator-treated, and dried at 80° C. for 5 minutes, thereby, the aqueous solution was dried to form a diffusion preventing layer A' to adhere both films, and a PET film was slowly peeled from this laminate. Further, an aqueous solution (viscosity: 11 cP) obtained by adding 3 parts of carboxyl group-modified polyvinyl alcohol ["Kuraray Poval KL318" obtained from Kuraray Co, Ltd.], and 1.5 parts of a water-soluble polyamidoepoxy resin ["Sumirez Resin 650" (aqueous solution having the solid content concentration of 30% by mass) obtained from Sumika Chemtex Co., Ltd.] as a heat crosslinking agent to 100 parts of water was coated on a side, from which the PET film had been peeled, with a wire bar coater (#20). A film piece obtained by cutting from the phase difference film (1) into a size of 140 mm×65 mm was overlapped on this coated surface, laminator-treated, and dried at 80° C. for 5 minutes, thereby, the aqueous solution was dried to form a diffusion preventing layer B', to adhere both films. Thereafter, a PET film was slowly peeled from this laminate, to obtain an elliptic polarizing plate with a front plate (5).

When concerning this elliptic polarizing plate with a front plate (5), cross section observation was performed using a scanning transmission electron microscope (STEM, field emission scanning electron microscope (FE-STEM), model number: "S-5500", produced by Hitachi, Ltd.), it was confirmed that a very thin elliptic polarizing plate of diffusion preventing layer A' (3 μm)/polarizing film (2 μm)/diffusion preventing layer B'(1 μm)/phase difference film (2 μm) from a front plate film side is formed. In this case, since the diffusion preventing layer A' also has the function as an adhesion layer with the front plate, and the diffusion preventing layer B' also has the function as an adhesion layer with the phase difference film, further reduction in the thickness can be attained. When the front plate (film) with a decorating layer is implemented roll-like, like the polarizing film and the phase difference film, a complex polarizing plate of the same configuration can also be continuously prepared by a Roll-to-Roll system.

Concerning this elliptic polarizing plate with a front plate (5), polarizing performance (polarization degree Py, single body transmittance Ty) and reflectivity were measured by making polarized light enter from a front plate side, as in Examples 1 and 2. Further, after heating at 100° C. for 120 hours, polarizing performance was measured again. The result thereof is shown in Table 1.

Comparative Example 1

Using the front plate with a decorating layer as a substrate, the composition for forming a photo-oriented film was coated on the substrate with a wire bar coater, and the laminate was dried at 100° C. for 2 minutes, and further, irradiated with polarized UV light in a 45° direction at intensity of 20 mJ/cm² (313 nm standard), to impart an orientation regulating force, to form a photo-oriented film.

The composition for forming a polarizing film was further coated on the resulting photo-oriented film using a wire bar coater, dried with an oven set at 110° C. for 2 minutes, and irradiated with ultraviolet light at 1000 mJ/cm²(365 nm standard) using a high pressure mercury lamp to cure the polymerizable liquid crystal, thereby, a polarizing film was formed to obtain a polarizing plate (6). Due to a level difference of the decorating layer, a film having the uniform thickness could not be made, and the uniform oriented state could not be obtained. Concerning the polarizing plate (6), since Haze due town orientation defect is high, polarizing performance and reflectivity could not be measured.

Comparative Example 2

According to the same manner as that of Example 1 except that the diffusion preventing layer A was not formed, a continuous polarizing plate roll (4) was prepared, and cut into a piece having a size of 120 mm×70 mm. A polarizing film surface of this piece and a decorating layer side of the front plate (film) with a decorating layer were stuck via a 5 μm adhesive (pressure-sensitive adhesive, produced by Lintec Corporation, the thickness 5 μm), and further, according to the same manner as that of Example 2, the phase difference film was transferred via a 5 μm adhesive, to prepare an elliptic polarizing plate with a front plate (7).

Concerning the resulting elliptic polarizing plate with a front plate (7), polarizing performance (polarization degree Py, single body transmittance Ty) and reflectivity were measured by making polarized light enter from a front plate side, as in Examples 1 and 2. Further, after heating at 100° C. for 120 hours, polarizing performance was measured again. The result thereof is shown in Table 1. In this case, the dichroic coloring matter was diffused into the adhesive from the polarizing film, and dichroism was deteriorated, and accordingly, a transmittance was reduced by about 27%, and a polarization degree was reduced by about 13%.

Comparative Example 3

According to the same manner as that of Example 1 except that, in place of the roll-like release polyethylene terephthalate having the film width of 800 mm, triacetylcellulose (TAC) film (KC4UY produced by Konica Minolta, Inc., the thickness 40 μm) was used as a substrate, and the diffusion preventing layer A was not formed, a continuous polarizing film roll (5) was prepared, apiece was excised from the resulting continuous polarizing film roll (5) into a size of 5 centimeters square, and a polarization degree and a single body transmittance were measured. Further, after heating at 100° C. for 120 hours, polarizing performance was measured again. The result is shown in Table 1. In this case, since the dichroic coloring matter was diffused into the TAC film slightly from the polarizing film, and dichroism was deteriorated, a transmittance was reduced by about 3%.

Comparative Example 4

According to the same manner as that of Example 1 except that, in place of the roll-like release polyethylene terephthalate having the film width of 800 mm, a triacetyl-cellulose (TAC) film (KC4UY produced by Konica Minolta, Inc., the thickness 40 μm) was used as a substrate, and the diffusion preventing layer B was not formed, a continuous polarizing film roll (6) was prepared, apiece was excised from the resulting continuous polarizing film roll (6) into a size of 5 centimeters square, and a polarization degree and a single body transmittance were measured. Further, after heating at 100° C. for 120 hours, polarizing performance was measured again. The result thereof is shown in Table 1. In this case, since the dichroic coloring matter was diffused into the atmospheric air from the polarizing film, and an absorbance derived from the dichroic coloring matter was reduced, a polarization degree was reduced by about 4%.

TABLE 1

|  |  | Configuration | Reflectivity | Thickness * | Initial Ty | Initial Py | Ty after 120 hours at 100° C. | Py after 120 hours at 100° C. |
|---|---|---|---|---|---|---|---|---|
| Example | 1 | Diffusion preventing layer A/polarizing film/diffusion preventing layer B | — | 4 μm | 42% | 97% | 41% | 96% |
|  | 2 | Glass/decorating layer/adhesive/diffusion preventing layer B/polarizing film/diffusion preventing layer A/adhesive/phase difference film | 5.5% | 16 μm | 42% | 97% | 41% | 96% |
|  | 3 | PMMA/decorating layer/diffusion preventing layer B'/polarizing film/diffusion preventing layer A/adhesive/phase difference film | 5.2% | 13 μm | 42% | 97% | 41% | 96% |
|  | 4 | PMMA/decorating layer/diffusion preventing layer A/polarizing film/diffusion preventing layer B'/phase difference film | 5.2% | 8 μm | 42% | 97% | 41% | 96% |
| Comparative Example | 1 | PMMA/decorating layer/polarizing film | — | 10 μm | — | — | — | — |
|  | 2 | Glass/decorating layer/adhesive/diffusion preventing layer B/polarizing film/adhesive/phase difference film | 5.2% | 14 μm | 42% | 97% | 15% | 84% |
|  | 3 | TAC/polarizing film/diffusion preventing layer B | — | 44 μm | 42% | 97% | 39% | 96% |
|  | 4 | TAC/diffusion preventing layer A/polarizing film | — | 44 μm | 42% | 97% | 41% | 93% |

* The thickness of the front plate and that of the decorating layer are excluded.

What is claimed is:

1. A polarizing plate comprising:
   a diffusion preventing layer A having the thickness of 20 μm or less;
   a polarizing film comprising a polymer of a polymerizable liquid crystal and an azo coloring matter, the polarizing film being formed from a composition comprising the polymerizable liquid crystal and the azo coloring matter, a content of the polymerizable liquid crystal in the composition being 70 to 99.5 parts by mass based on 100 parts by mass of the solid content of the composition; and
   a diffusion preventing layer B having a thickness of 20 μm or less, in this order.

2. The polarizing plate according to claim 1, wherein the thickness of each of the diffusion preventing layers A and B is in a range of 0.05 μm to 3 μm.

3. The polarizing plate according to claim 1, wherein at least one of the diffusion preventing layers A and B comprises a water-soluble polymer.

4. The polarizing plate according to claim 1, wherein the polymerizable liquid crystal is a thermotropic liquid crystal compound exhibiting a smectic phase.

5. The polarizing plate according to claim 4, wherein the polarizing film comprises a polymer of a polymerizable liquid crystal obtained by polymerization in a state of a smectic phase.

6. A polarizing plate assembly comprising a polarizing plate according to claim 1 and an adhesive layer, wherein the polarizing plate has the adhesive layer on a side of the diffusion preventing layer A or the diffusion preventing layer B, which is opposite to the polarizing film.

7. The polarizing plate according to claim 1, wherein the thickness of at least one of the diffusion preventing layers A and B is in a range of 0.5 μm to 3 μm.

8. A polarizing plate assembly comprising a polarizing plate according to claim 1 and a front plate arranged on a side of the diffusion preventing layer A or the diffusion preventing layer B, which is opposite to the polarizing film.

9. The polarizing plate assembly according to claim 6, further comprising a front plate arranged on a side of the adhesive layer which is opposite to the diffusion preventing layer A or the diffusion preventing layer B.

10. The polarizing plate assembly according to claim 8, wherein the front plate has on at least one side thereof one or more patterning layers selected from the group consisting of the following (A) to (D):
    (A) Color filter layer;
    (B) Thin-film transistor (TFT) layer;
    (C) Transparent electrode layer; and
    (D) Decorating layer.

11. The polarizing plate with a front plate according to claim 9, wherein the front plate has on at least one side thereof one or more patterning layers selected from the group consisting of the following (A) to (D):
    (A) Color filter layer;
    (B) Thin-film transistor (TFT) layer;
    (C) Transparent electrode layer; and
    (D) Decorating layer.

12. An elliptic polarizing plate assembly comprising a polarizing plate according to claim 1 and a phase difference film on a side of the diffusion preventing layer A or the diffusion preventing layer B, which is opposite to the polarizing film.

13. An elliptic polarizing plate assembly comprising a polarizing plate according to claim 6 and a phase difference film on a side of the adhesive layer which is opposite to the diffusion preventing layer A or the diffusion preventing layer B.

14. An elliptic polarizing plate assembly comprising a polarizing plate according to claim 8 and a phase difference film on a side of the diffusion preventing layer A or the diffusion preventing layer B, which is opposite to the polarizing film.

15. An elliptic polarizing plate assembly comprising a polarizing plate according to claim 9 and a phase difference film on a side of the diffusion preventing layer A or the diffusion preventing layer B, which is opposite to the polarizing film.

16. The elliptic polarizing plate according to claim 12, wherein the phase difference film satisfies the following expressions (1), (2) and (3):

$$Re(450)/Re(550) \leq 1.00 \quad (1)$$

$$1.00 \leq Re(650)/Re(550) \quad (2)$$

$$120 \leq Re(550) \leq 180 \quad (3),$$

wherein Re(450), Re(550) and Re(650) represent in-plane retardation at wavelengths of 450 nm, 550 nm and 650 nm, respectively.

17. The elliptic polarizing plate according to claim 13, wherein the phase difference film satisfies the following expressions (1), (2) and (3):

$$Re(450)/Re(550) \leq 1.00 \quad (1)$$

$$1.00 \leq Re(650)/Re(550) \quad (2)$$

$$120 \leq Re(550) \leq 180 \quad (3),$$

wherein Re(450), Re(550) and Re(650) represent in-plane retardation at wavelengths of 450 nm, 550 nm and 650 nm, respectively.

18. An organic electroluminescence display device equipped with a polarizing plate according to claim 1.

19. A liquid crystal display device equipped with a polarizing plate according to claim 1.

20. A process for producing a polarizing plate assembly having a front plate, the process comprising a step of transferring a polarizing plate according to claim 1 onto the front plate.

21. A process for producing a polarizing plate according to claim 1, the process comprising the following steps (a) to (c):
  (a) a step of forming a diffusion preventing layer A on a substrate;
  (b) a step of forming a polarizing film on the diffusion preventing layer A; and
  (c) a step of forming a diffusion preventing layer B on the polarizing film.

22. A process for producing a polarizing plate according to claim 1, the process comprising the following steps (a) to (e):
  (a) a step of forming a diffusion preventing layer A on a substrate;
  (b) a step of forming a polarizing film on the diffusion preventing layer A;
  (c) a step of coating a diffusion preventing layer composition for forming a diffusion preventing layer B on the polarizing film or on an adherend;
  (d) a step of sticking the polarizing film and the adherend via the diffusion preventing layer composition; and
  (e) a step of forming the diffusion preventing layer B by curing the diffusion preventing layer composition.

23. A process for producing a polarizing plate according to claim 1, the process comprising the following steps (a) to (h):
  (a) a step of forming a polarizing film on a substrate;
  (b) a step of coating a first diffusion preventing layer composition for forming a diffusion preventing layer B on the polarizing film or on a first adherend;
  (c) a step of sticking the polarizing film and the first adherend via the first diffusion preventing layer composition;
  (d) a step of forming the diffusion preventing layer B by curing the first diffusion preventing layer composition;
  (e) a step of removing the substrate;
  (f) a step of coating a second diffusion preventing layer composition for forming a diffusion preventing layer A on a surface of the polarizing film, from which the substrate has been removed, or on a second adherend;
  (g) a step of sticking the surface of the polarizing film, from which the substrate has been removed, and the second adherend via the second diffusion preventing layer composition; and
  (h) a step of forming the diffusion preventing layer A by curing the second diffusion preventing layer composition.

\* \* \* \* \*